(12) United States Patent
Stravitz

(10) Patent No.: US 11,375,814 B1
(45) Date of Patent: Jul. 5, 2022

(54) ELONGATE STABILIZERS FOR PREVENTING FURNITURE FROM TIPPING

(71) Applicant: Dooli Products, LLC, New York, NY (US)

(72) Inventor: David M. Stravitz, New York, NY (US)

(73) Assignee: Thoughtful Furniture Company, LLC, New York, NY (US)

( * ) Notice: Subject to any disclaimer, the term of this patent is extended or adjusted under 35 U.S.C. 154(b) by 0 days.

(21) Appl. No.: 17/451,275

(22) Filed: Oct. 18, 2021

Related U.S. Application Data

(63) Continuation-in-part of application No. 17/304,594, filed on Jun. 23, 2021, now Pat. No. 11,162,631.

(51) Int. Cl.
*A47B 97/00* (2006.01)
*F16B 1/00* (2006.01)

(52) U.S. Cl.
CPC ............. *A47B 97/00* (2013.01); *F16B 1/00* (2013.01); *A47B 2097/008* (2013.01); *F16B 2001/0028* (2013.01)

(58) Field of Classification Search
CPC ...... F16M 2200/061; E05D 3/06; E05D 3/12; E05D 3/14; E04C 2003/026; E04C 2003/0421; E04C 2003/0447; A47B 2097/008; A47B 97/00
USPC ....... 16/366, 368, 369, 370; 248/351, 354.1, 248/500, 506, 510, 551, 447, 454, 455, 248/456, 457, 460, 465, 462
See application file for complete search history.

(56) References Cited

U.S. PATENT DOCUMENTS

| | | | |
|---|---|---|---|
| 3,574,981 A | 4/1971 | Henschen | |
| 4,304,078 A | 12/1981 | Meriwether, Jr. | |
| 6,220,562 B1 | 4/2001 | Konkle | |
| 6,751,921 B1 | 6/2004 | Iwakawa | |
| 6,854,222 B2 | 2/2005 | Hausert | |
| 6,957,515 B1 | 10/2005 | Hatfield | |
| 6,966,528 B1 * | 11/2005 | Hare | A47B 81/06 248/178.1 |
| 7,175,149 B2 * | 2/2007 | Gallien | A47B 97/00 248/500 |
| 7,510,155 B2 | 3/2009 | Huang et al. | |
| 7,530,538 B2 | 5/2009 | Whalen et al. | |
| 7,740,218 B2 * | 6/2010 | Green | F16M 11/28 248/351 |
| 8,087,624 B2 * | 1/2012 | Varney | F16M 11/10 248/125.8 |
| 8,262,045 B2 | 9/2012 | Green | |
| 8,544,804 B2 | 10/2013 | Schouten | |

(Continued)

*Primary Examiner* — Alfred J Wujciak
(74) *Attorney, Agent, or Firm* — Brian Roffe

(57) ABSTRACT

Stabilizer for a piece of furniture, such as a dresser or television, includes an elongate portion, a top flap or plate flexibly connected at an upper end of the rigid portion, and a bottom flap or plate flexibly connected at a lower end of the rigid portion. An outer planar surface of the top plate is attached to the piece of furniture while an outer planar surface of the bottom plate is attached to a vertical support surface behind the piece of furniture. When the stabilizer is attached to the piece of furniture at a location above the location at which the stabilizer is attached to the vertical support surface and the stabilizer is in a vertical orientation, the stabilizer provides resistance to tipping of the piece of furniture away from the vertical support surface.

20 Claims, 31 Drawing Sheets

(56) References Cited

U.S. PATENT DOCUMENTS

| | | | |
|---|---|---|---|
| 9,395,039 B2 | 7/2016 | Cozza | |
| 9,518,695 B2 | 12/2016 | Whalen et al. | |
| 9,709,216 B2 * | 7/2017 | Zing | F16B 9/05 |
| 9,814,312 B2 | 11/2017 | McGowan et al. | |
| 10,113,687 B2 * | 10/2018 | Wise | F16M 13/02 |
| 10,278,494 B2 | 5/2019 | Hollis et al. | |
| 10,413,061 B2 | 9/2019 | Whalen et al. | |
| 2006/0278795 A1 * | 12/2006 | Lee | F16M 11/10 248/371 |
| 2019/0150617 A1 * | 5/2019 | Lager | F16M 13/02 |

* cited by examiner

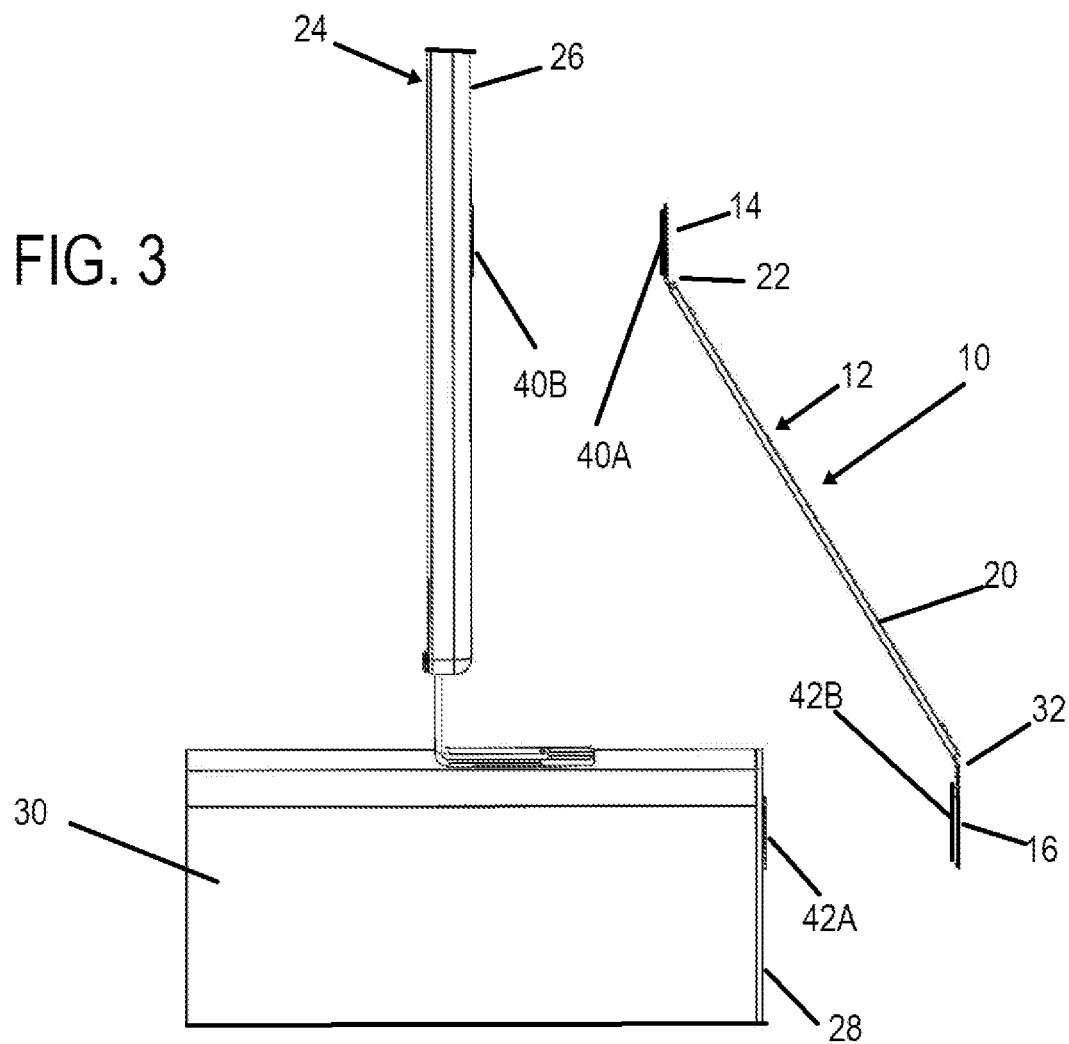

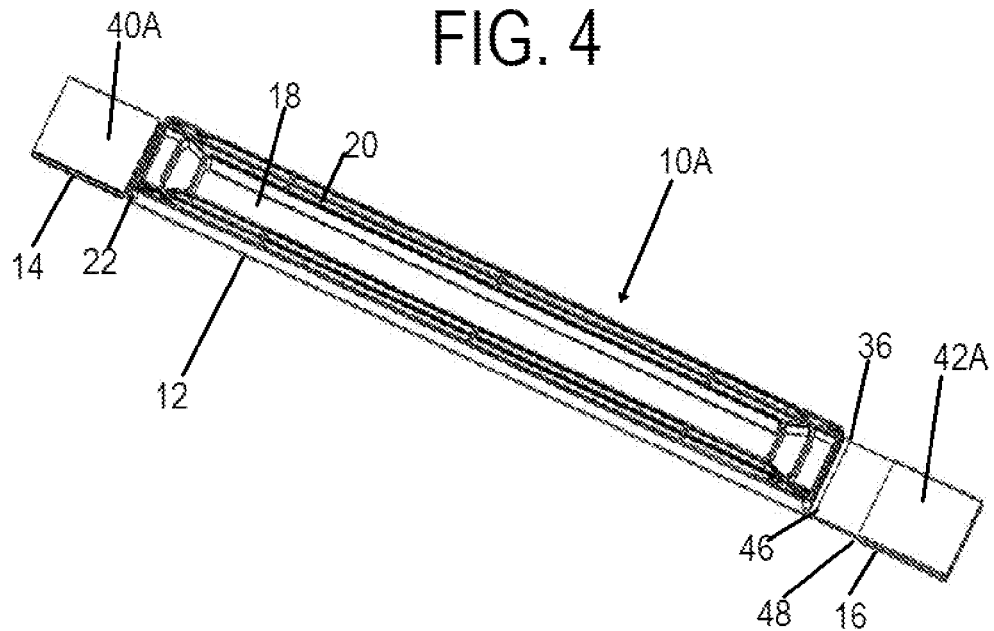
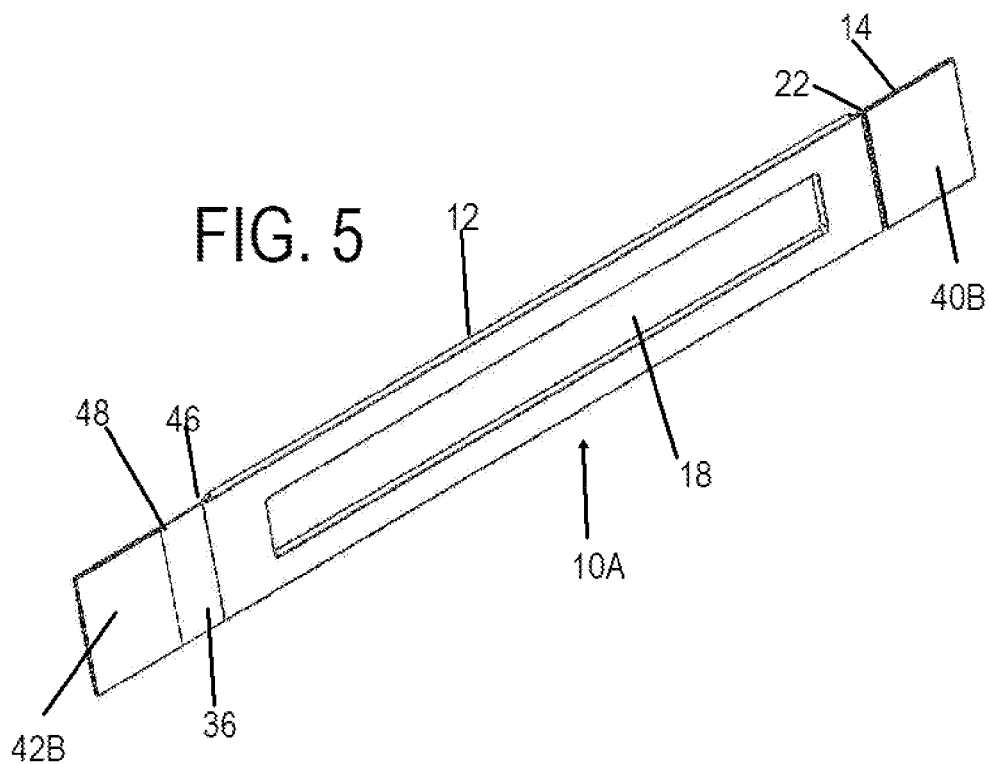

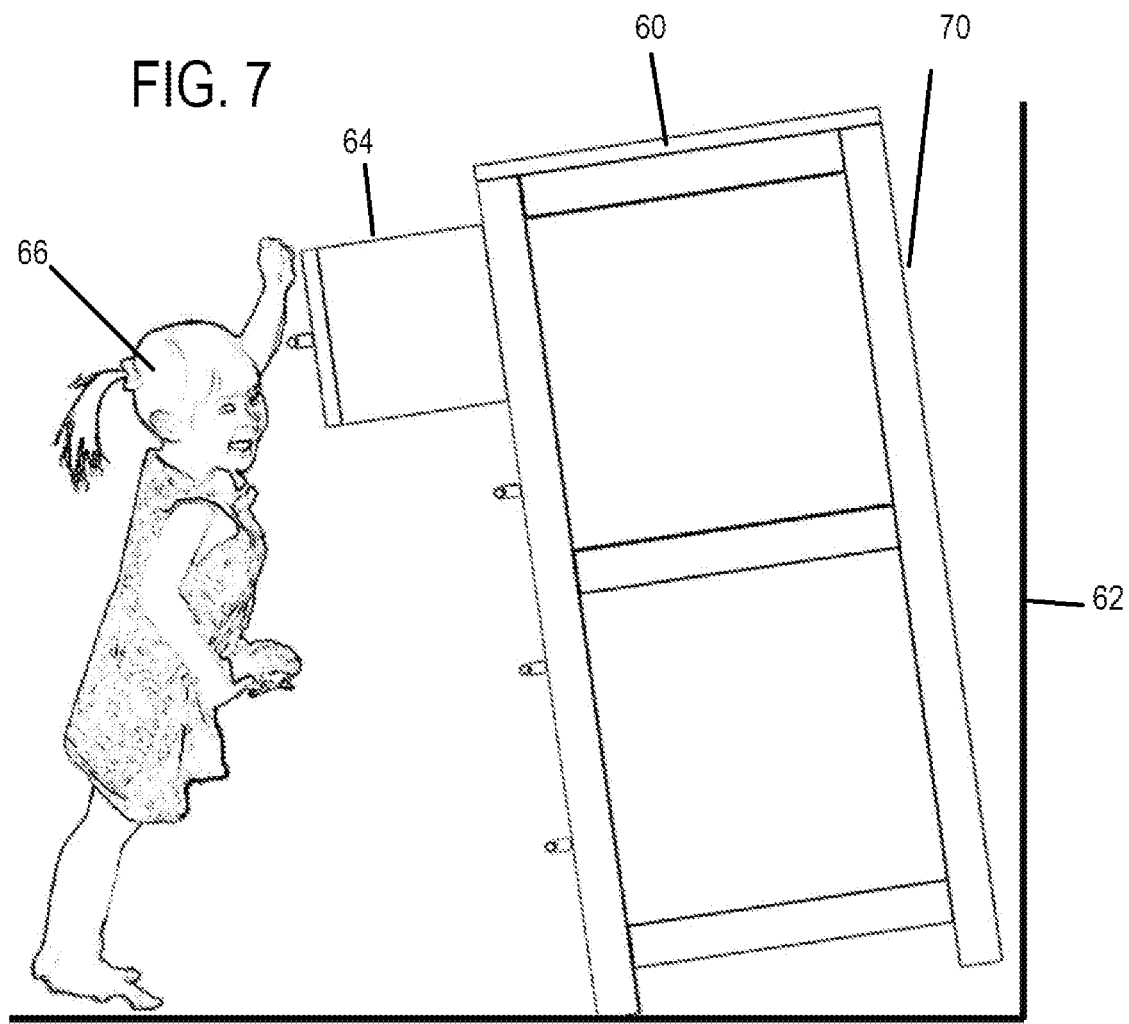

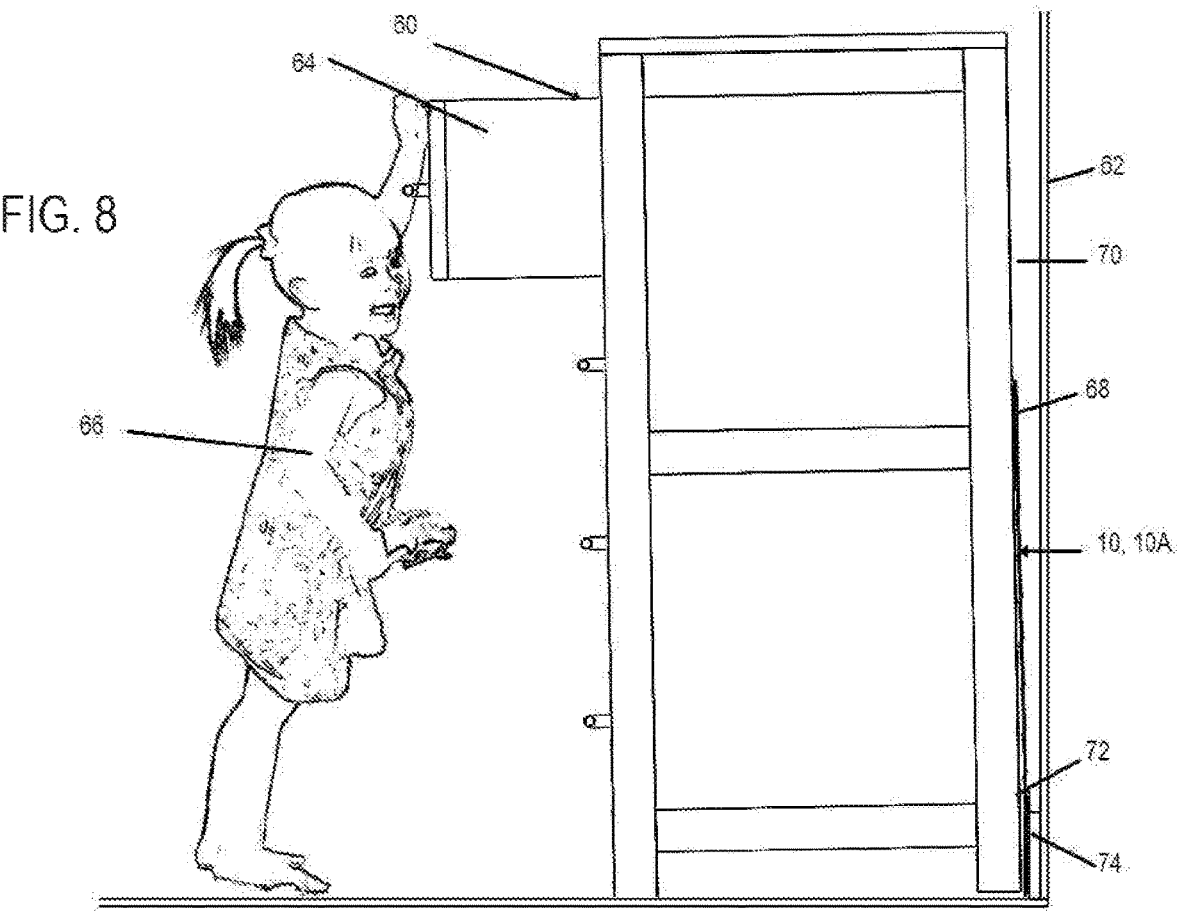

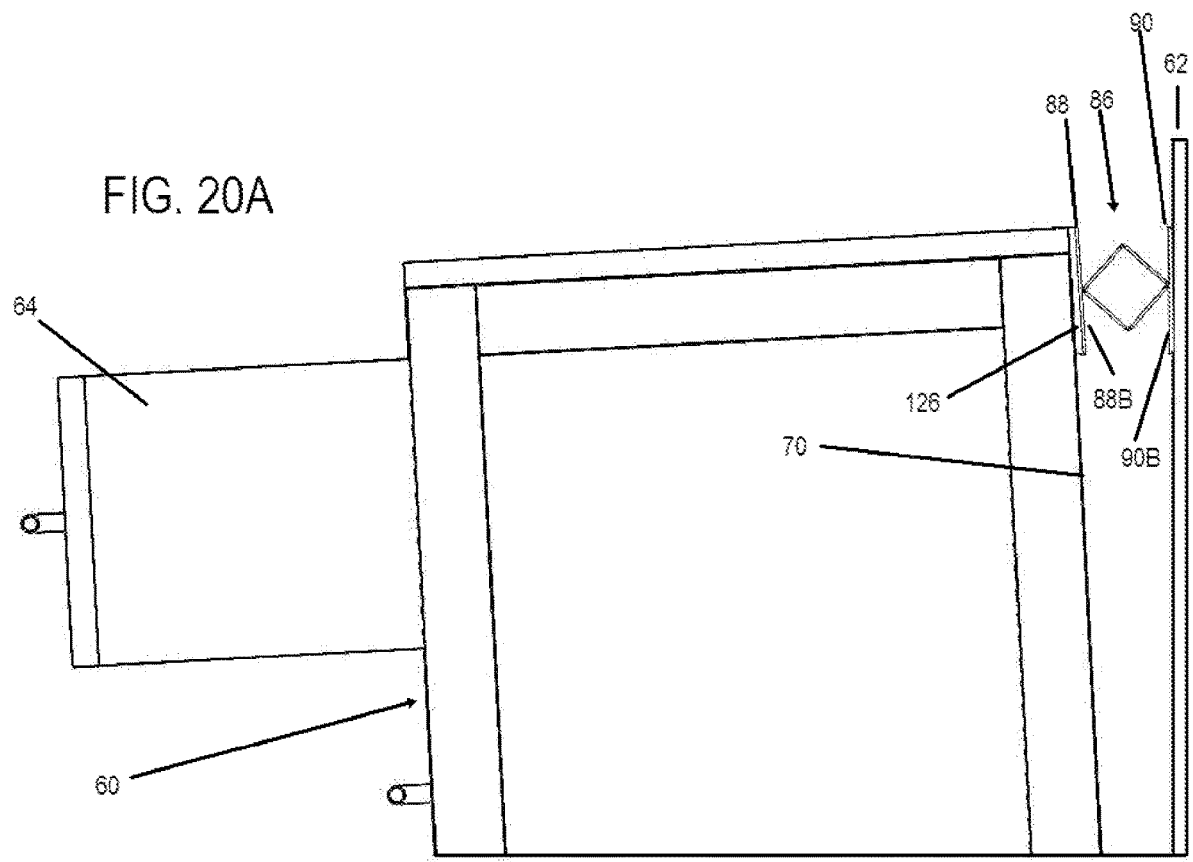

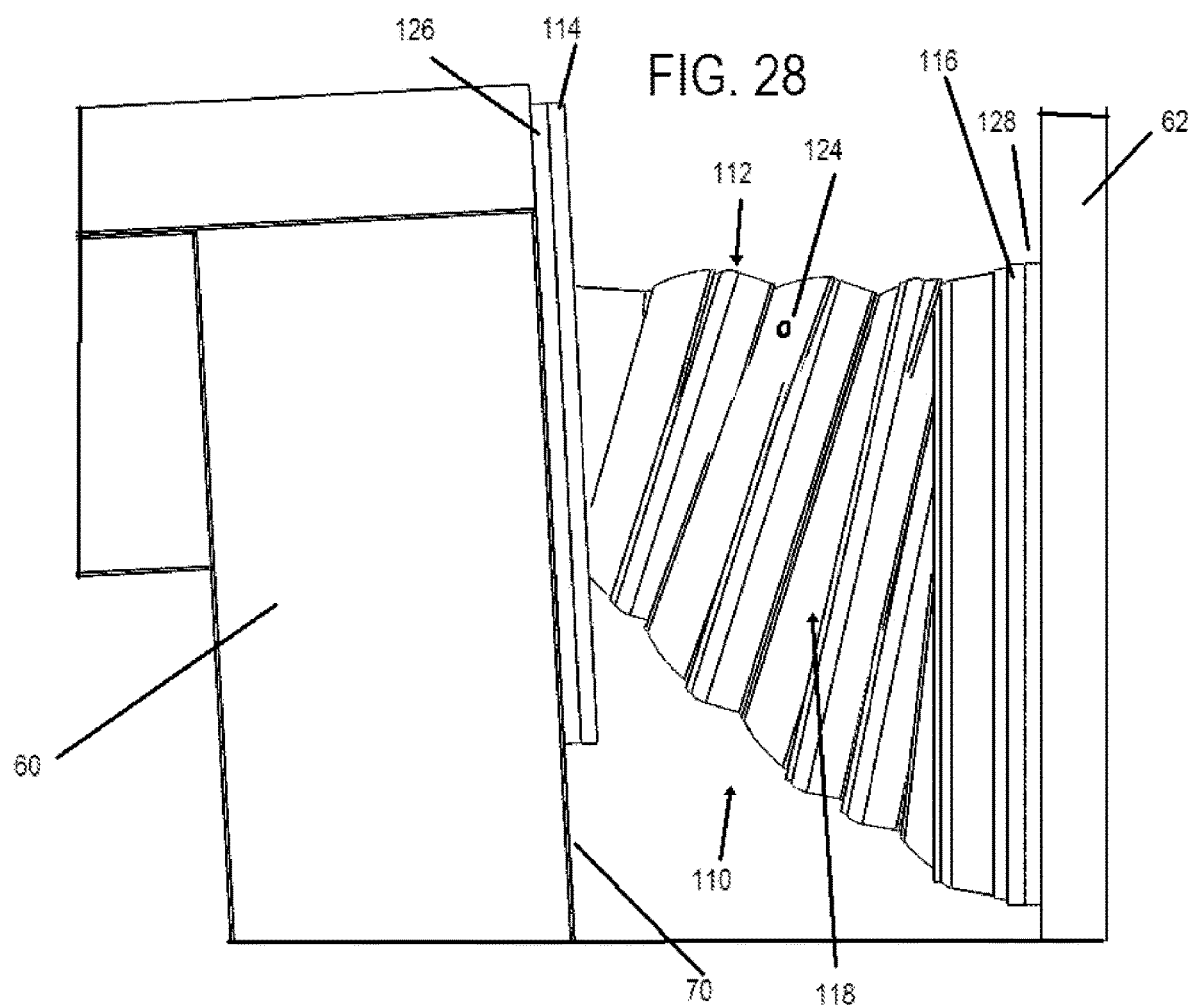

ELONGATE STABILIZERS FOR PREVENTING FURNITURE FROM TIPPING

CROSS-REFERENCE TO RELATED APPLICATION

This application is a continuation-in-part of U.S. patent application Ser. No. 17/304,594 filed Jun. 23, 2021, now U.S. Pat. No. 11,162,631, which is incorporated by reference herein.

FIELD OF THE INVENTION

The present invention relates to a stabilizer for furniture, e.g., a dresser, that secures the furniture to a fixed structure, such as a wall. The present invention also relates to a stabilizer for furniture that prevents the furniture from tipping over, for example, onto a child pulling the furniture or a drawer thereof forward, and thereby preventing injury to the child and possible death.

BACKGROUND OF THE INVENTION

The advent of affordable televisions, or TV, and image display technology such as 4K High Definition, Ultra High Definition, OLED, Smart TV's, LCD liquid crystals. resulted in the introduction of home TV sets that are large. These TV sets resemble more like that of framed pictures than they do the conventional television sets of previous decades. Further, the excellent clarity and precision of cable and satellite signal communication and processing, in association with these new viewing technologies, has led to larger (taller and wider) and lighter viewing screens.

Typically today the commercially available HD and UHD screens and liquid crystal displays, because of their thin constructions, are marketed for and installed on walls in a home family room or entertainment area. These installations are complicated and involve not only mounting the screen on the wall, but also the routing of video and speaker cabling within the walls or behind large pieces of furniture. Once installed, the screen is by practical and economic necessity a more or less permanent fixture. Further, such installation of the screen aesthetically challenges the arrangement of other furnishings within the chosen room.

Attempts to develop furniture-top stands have been met with only marginal success since these taller, longer screens, while thinner, can still easily monopolize the entire top or shelf of a large piece of furniture to the exclusion of other items or accessories.

Moreover, it is a problem when children are present that the TV can easily tip over if not adequately secured to the wall or furniture. Injury and possible death of the child can result from a large TV tipping over.

Conventional TV anti-tipping products on the market are often webbing straps that screw on one end to the threaded screw holes in the back of the TV and then are screwed into the backs of the TV stands. Often, there are two straps that tighten up to each other to take up the slack so the TV is secured.

U.S. Pat. No. 7,530,538 (Whalen et al.) describes a for supporting a substantially flat television screen over a piece of furniture of the type having an upper surface with spaced apart front and rear edges, and a back. The device comprises a pedestal and an upper support. The pedestal includes a base for supporting the weight of the screen on a floor surface, a column extending vertically upwardly from the base, and a bracket for connecting the column to the back of the piece of furniture so that the column is held in position against the piece of furniture. The upper support includes a post that is connected to and vertically adjustable with respect to the column, a cantilever support arm extending forwardly from the vertically adjustable post, the support arm terminating in a free end, and a screen mounting member connected to the free end of the support arm for receiving the flat screen television. When the device is mounted adjacent the back of the piece of furniture, with the post vertically adjusted to a desired height, and with a flat television screen attached to the screen mounting member, the flat screen may be supported above the upper surface and at a prescribed point between the front and rear edges of the piece of furniture.

U.S. Pat. No. 7,402,18 (Greed) describes a support device for an appliance that includes a mounting plate having holes and which is attached to a side of the appliance with a fastener extending through each hole and into a corresponding receiving hole in the appliance. A mounting bracket attaches to a stand structure. A brace is between the mounting plate and the mounting bracket. Each hole in the mounting plate accommodates the receiving hole of a variety of different appliances.

Like large TV's, furniture is equally susceptible to tipping. Furniture tipping accidents and deaths are on the rise. The majority many of toddler furniture pieces, typically dressers, are anywhere from about 16 inches to about 24 inches deep and often toddlers can grab the top of the dresser, grab the top drawer of the dresser and even climb into the bottom drawer of the dresser before the parent is aware of this. Top drawers of these dressers often have heavy contents in them further making the dresser more easy to tip over, which when it occurs, often results in the toddler getting severely hurt, sometimes even rushed to the hospital and even more worrisome, a tragic death.

Many products on the market currently offer the ability to attach the upper back of a piece of furniture, e.g., a dresser, to the wall or other vertical support behind the dresser with a webbing strap or cable so the tipping issue is caught and restricted before the entire dresser falls forward. Yet, this can also allow the topmost dresser drawer to fall forward and still cause accidents. Proper fastening of the dresser to the wall poses yet another issue insofar as it is possible that the screws on the wall or the screws on the dresser are ripped apart when the tipping force is too much, especially if the webbing strap or cable is not attached properly in a safe or secure manner and location. After all, most dresser backs are very cheaply made with the backs often ⅛" thin pressboard or plywood and the frame is typically ⅝"-¾" and made of plywood or even less secure presswood typically used today.

Also, it is possible that the wall mounting was installed without the use of appropriate hardware such as mollies or lead plugs. If that were so, it would take little force for the tipping force exerted by the child or toddler to "rip" a wall-mounting bracket right off the wall thus allowing the dresser to continue its fall. Furthermore, if the frame is presswood, it would not take much force to "rip off" the mounting screws securing the webbing or cable to the frame or back.

OBJECTS AND SUMMARY OF THE INVENTION

It is an object of at least one embodiment of the invention to provide a stabilizer for a piece of furniture that secures the piece of furniture to a fixed structure, such as a wall. It is another object of at least one embodiment of the invention to provide a stabilizer for a piece of furniture that secures the piece of furniture to a vertical support surface behind the piece of furniture and prevent tipping of the piece of furniture away from the vertical support surface, such as may occur when a child pulls the piece of furniture forward.

It is an object of at least one embodiment of the invention to provide a stabilizer for securing flat screen TVs, which are substantially larger than in the past, securely to the rear vertical wall behind the TV so as to resist the new substantially larger flat screen TVs from forcefully being tipped forward and thus cause injuries and possibly even death to youngsters.

In order to achieve at least one of these objects and others, a stabilizer for a piece of furniture in accordance with the invention includes an elongate preferably rigid portion, a top flap or plate flexibly connected at an upper end of the elongate portion, and a bottom flap or plate flexibly connected at a lower end of the elongate portion. In use, a planar surface of the top flap is attached to the piece of furniture by attachment structure at least partly on this planar surface, and a planar surface of the bottom flap is attached to a vertical support surface behind the piece of furniture by attachment structure at least partly on this planar surface. Thus, when the stabilizer is attached to the piece of furniture at a location above the location at which the stabilizer is attached to the vertical support surface and the stabilizer is in a vertical orientation, the stabilizer provides resistance to tipping of the piece of furniture away from the vertical support surface.

For storage and shipping purposes, the elongate portion, top flap and bottom flap may have a flatten or flat state, and they can have a unibody construction. An integral hinge can flexibly connect the top flap to the upper end of the elongate portion, while another integral hinge flexibly connects the bottom flap to the upper end of the elongate portion. The attachment structure may be hook and loop fasteners, e.g., VELCRO®. To enable attachment of the bottom flap to either a wall behind the piece of furniture or to a lower part of the same or a different piece of furniture, the bottom flap defines opposite planar surfaces on opposite sides of the stabilizer to which the attachment structure may be attached.

Another version of the stabilizer includes an elongate portion having opposed ends, a first plate having an inner major surface and an outer planar surface, a second plate having an inner major surface and an outer planar surface, and two hinges that each pivotally connect a respective end of the elongate portion to the inner major surface of the first and second plates. The first plate is operatively attached to the piece of furniture with its outer planar surface lying against the piece of furniture and the second plate is operatively attached to a vertical support surface behind the piece of furniture with its outer planar surface lying against the vertical support surface. When the stabilizer is attached to the piece of furniture at a location above the location at which the stabilizer is attached to the vertical support surface and the stabilizer is in a vertical orientation, the stabilizer provides resistance to tipping of the piece of furniture away from the vertical support surface.

The hinges may connect the respective end of the elongate portion to a central area of the inner major surface of the respective plate midway between upper and lower edges of this major surface. The hinges may be integral or living hinges. Attachment of the outer planar surfaces of the plates may be achieved using hook and loop fasteners (e.g., VELCRO®).

A method for stabilizing a piece of furniture in accordance with the invention includes providing a stabilizer having an elongate preferably rigid portion, a top plate flexibly connected to an upper end of the elongate portion, and a bottom plate flexibly connected to a lower end of the elongate portion, attaching the top plate to a rear surface of the piece of furniture using first attachment structure on a planar surface of the top plate, and attaching the bottom plate to a vertical support surface behind the piece of furniture using second attachment structure on a planar surface of the bottom plate. In one method, a bottom edge of the top plate is flexibly connected to the upper end of the elongate portion and a top edge of the bottom plate is flexibly connected to the lower end of the elongate portion. Alternatively, a central region of the top plate is flexibly connected to the upper end of the elongate portion and a central region of the bottom plate is flexibly connected to the lower end of the elongate portion. The bottom plate may be attached to a floorboard or wallboard of a wall that constitutes the vertical support surface.

Optionally, the stabilizer may be provided with a thin wall having a bendable portion at its top adjacent the lower end of the elongate portion and a bendable portion at its bottom adjacent the bottom plate. The bottom plate can then be attached to the vertical support surface behind the piece of furniture by bending the thin wall over a top shelf of the piece of furniture such that the bottom plate is alongside an underside or lower surface of the top shelf and attaches to the underside or lower surface of the top shelf.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 3 is a side view showing the manner in which the stabilizer of FIG. 1 is installed to secure a TV to a rear surface of a piece of furniture.

FIG. 4 is a front perspective view of a second embodiment of a stabilizer in accordance with the invention.

FIG. 5 is a rear perspective view of the embodiment of a stabilizer in accordance with the invention shown in FIG. 4.

FIG. 7 is a view showing a child pulling at a piece of furniture, namely a dresser, and the furniture about to tip onto the child;

FIG. 8 is a view of the stabilizer of FIG. 1 shown securing a piece of furniture, namely, a dresser, at a lower position to a wall to address the tipping situation shown in FIG. 7.

FIG. 20A is a view of the stabilizer of FIG. 17 shown in an installed, partly expanded state.

FIG. 28 is an enlarged view of the stabilizer in the state shown in FIG. 27.

DETAILED DESCRIPTION OF THE INVENTION

Figure 1:
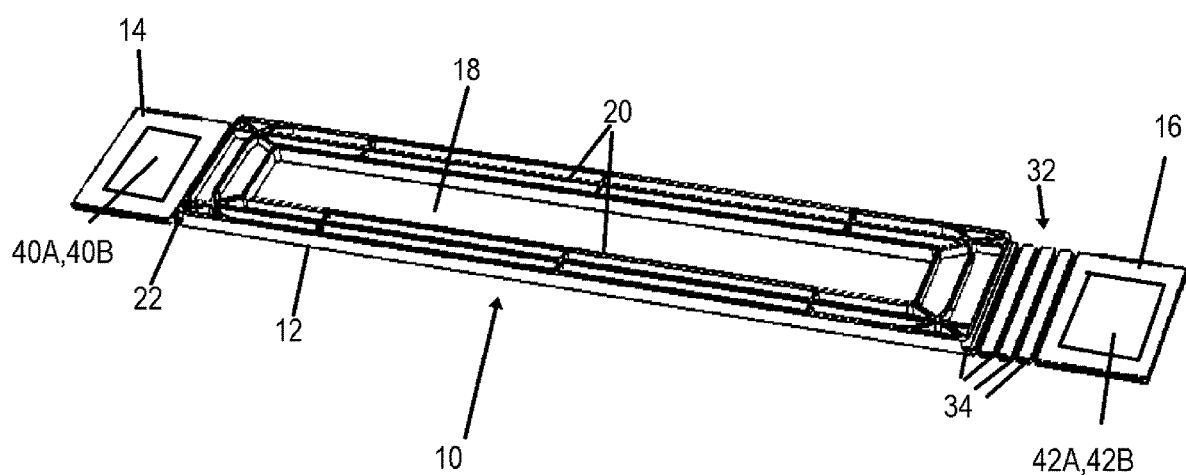
FIG. 1 is a perspective view of one embodiment of a stabilizer in accordance with the invention.

As shown in FIG. 1, a stabilizer 10 in accordance with the invention includes a central elongate, preferably rigid portion 12, a top flap 14 at an upper end of the rigid portion 12 and a bottom flap 16 at a lower end of the rigid portion 12. Stabilizer 10 can be a flat product sold in the flat condition shown in FIG. 1 to optimize shipping conditions and placement into a shipping box. It can have dimensions of about 4 inches wide and about 23 to about 31 inches long. Moreover, the top and bottom flaps 14, 16 can be folded 180 degrees to provide a further reduction in the length of the stabilizer 10 when packaged.

The rigid portion 12 can have numerous, different forms but it is essential that it be rigid. As shown, the rigid portion 12 has an elongate opening 18 surrounded by ridges or raised ribs 20. Ribs 20 may be considered reinforcement structure that reinforces the longitudinal rigidity of the rigid portion 12. Other forms of reinforcement structure may be used in the invention. The raised ribs 20 add a level of rigidity and, if necessary, can be reinforced with added ribbing, or if necessary a steel rod or plate can be overmolded for added sturdiness and stability.

The top flap 14 is hingedly or flexibly connected to the upper end of the rigid portion 12 by an integral hinge 22 (see FIG. 1). The integral hinge 22 can have different forms, including what is commonly considered a living hinge, i.e. a hinge formed from the same material as the rigid portion 12 and the top flap 14. The integral hinge 22 is linear and extends in a direction between opposed lateral edges of the stabilizer 10.

Figure 2:
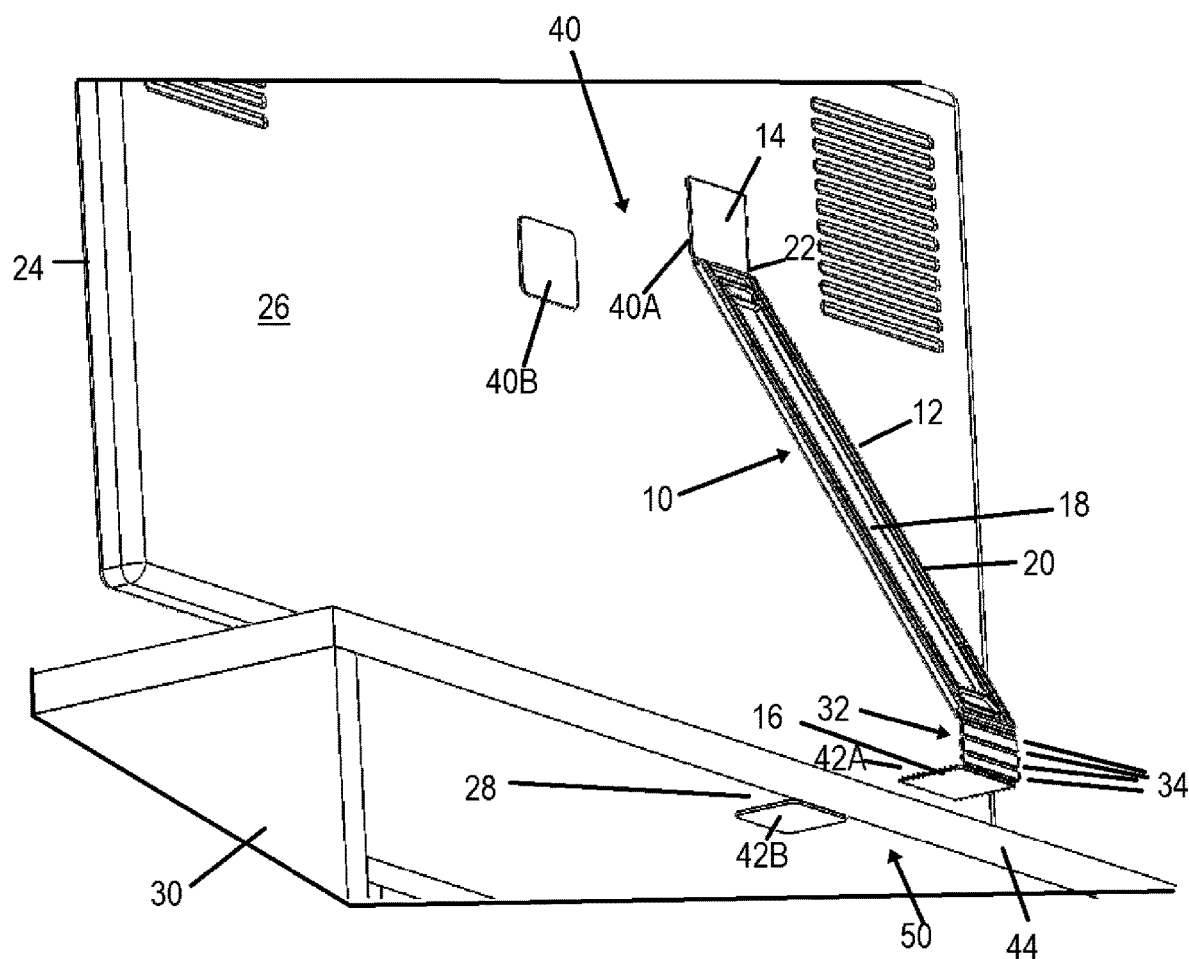
FIG. 2 is a view showing the manner in which the stabilizer of FIG. 1 is installed to secure a television (TV) to a piece of furniture.

Referring now to FIGS. 2 and 3, the integral hinge 22 is configured to enable the top flap 14 to be attached to a TV 24, invariably a rear surface 26 thereof, and is adjustable to conform to the variable angle of the rear surface 26 of the TV 24 relative to the rigid portion 12. This means that the angle between the top flap 14 and the rigid portion 14 is variable when the stabilizer 10 is installed. The angle can be any reasonable angle, and since the back or rear surface 26 of the TV 24 is usually vertical or close to vertical, and the location 28 on the wall or other piece of furniture 30 to which the bottom flap 16 is to be attached is also vertical or almost vertical, the angle depends in large part on the distance between the back or rear surface 26 of the TV 24 and the location 28 on the wall or other piece of furniture 30 to which the bottom flap 16 is to be attached.

The bottom flap 16 is hingedly or flexibly connected to the lower end of the rigid portion 12 by a plurality of integral hinges 32 (best seen in FIGS. 1 and 2), or a single flexible member as shown in FIGS. 3-5 described below. Each integral hinge 32 can have different forms, including what is commonly considered a living hinge, i.e. a hinge formed form the same material as the rigid portion 12 and the bottom flap 14. Although a plurality of integral hinges 34 are shown, there may be only a single integral hinge. Each integral hinge 32, e.g., the living hinges 34, extends linearly and in a direction between opposed lateral edges of the stabilizer 10.

As shown, there are four living hinges so the bottom flap 16 is able to wrap around, for example, the back of the top shelf 44 (see FIG. 2) that could be as much as ¾ inches in thickness to that about 1.5 inches in thickness. The four living hinges are equally spaced a total of about 4 inches from the uppermost to the lowermost hinge, i.e., a spacing of about one inch between each pair of adjacent hinges. The flat portion of the bottom flap 16 below the lowermost hinge may be about 4" wide×3" high and is designed to accept VELCRO® or double-sided tape as mentioned below.

The integral hinges 32 are configured to enable the bottom flap 16 to be attached to the location 28 on the wall or other piece of furniture 30 and are adjustable to conform to the variable angle of the rear surface of the location 28 on the wall or other piece of furniture 30 relative to the rigid portion 12. This means that the angle between the bottom flap 16 and the rigid portion 12 is variable when the stabilizer 10 is installed. The angle can be any reasonable angle, and since the back or rear surface 26 of the TV 24 is usually vertical or close to vertical, and the location 28 on the wall or other piece of furniture 30 to which the bottom flap 16 is to be attached may also vertical or almost vertical (see, e.g., FIG. 3), the angle depends in large part on the distance between the back or rear surface 26 of the TV 24 and the location 28 on the wall or other piece of furniture 30 to which the bottom flap 16 is to be attached.

In view of the ability to angle the top flap 14 and bottom flap 16 relative to the rigid portion 12 as desired, the stabilizer 10 can take many different shapes when installed. Indeed, it is possible to position the TV 24 on the piece of furniture 30, connect the top flap 14 to the rear surface 26 of the TV 24 and connect the bottom flap 16 to the back of the piece of furniture (see FIG. 3), and the rigid portion will have set angles relative to the TV 24 and piece of furniture 30. It is then possible to move the TV 24 forward or backward along the upper surface of the piece of furniture 30 and the rigid portion 12 will change its angular orientation relative to the TV 24 and back of the piece of furniture 30. This is all made possible by the presence of the integral hinges 22, 32.

Figure 6:
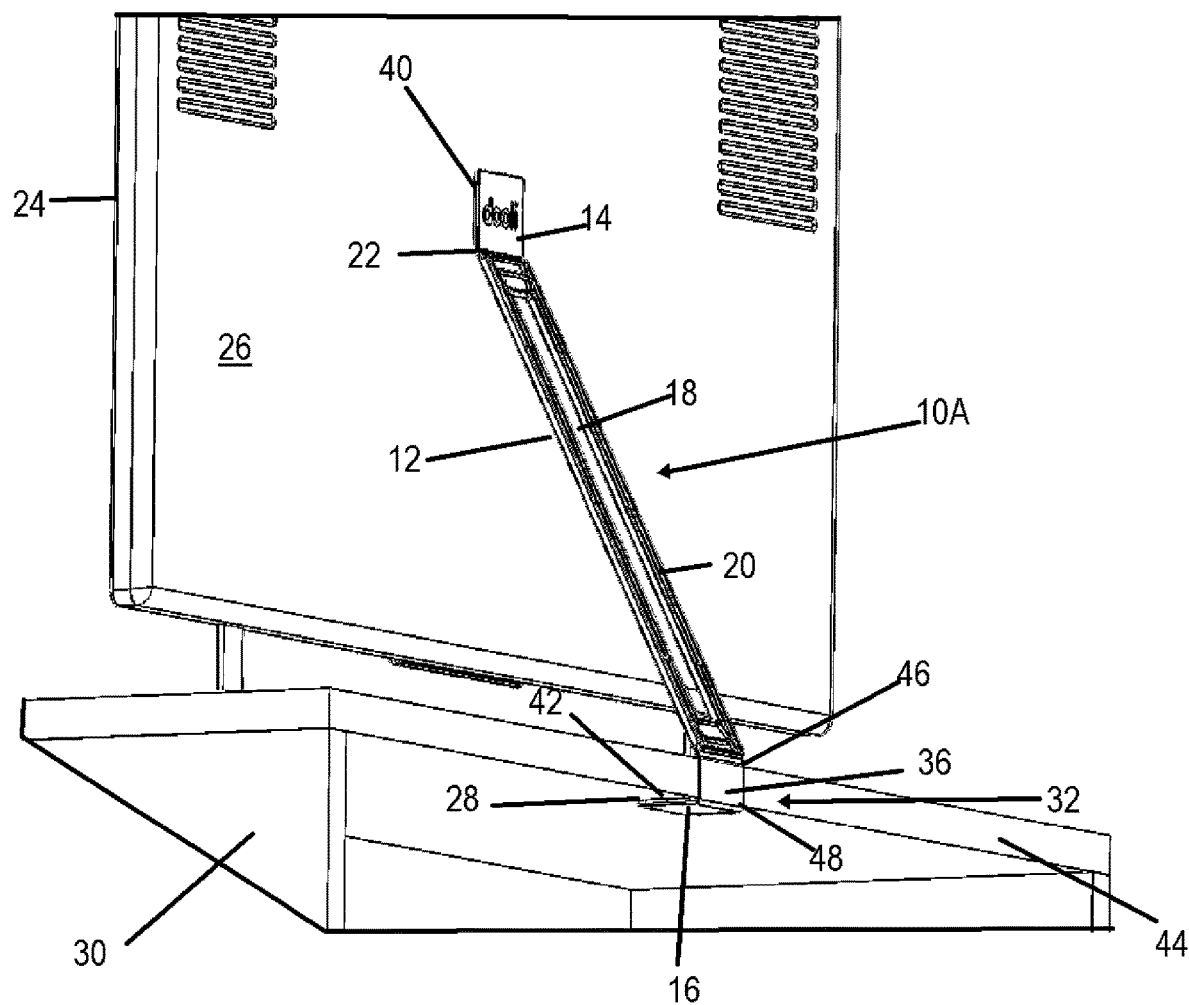
FIG. 6 is a view showing another embodiment of a stabilizer of FIGS. 4 and 5 shown installed to secure a TV to a piece of furniture.

FIGS. 4 and 5 show another embodiment of a stabilizer, designated 10A. Stabilizer 10A has the same features as stabilizer 10, and only differences will be identified. FIG. 6 shows an exemplifying use of the stabilizer 10A.

As shown in FIGS. 4-6, instead of a plurality of living hinges 34 as the interface between the lower end of the rigid portion 12 and the bottom flap 16 as in the embodiment shown in FIGS. 1-3, the interface of the stabilizer 10A may include a thin wall 36 having a hinge or bendable portion 46 at its top and another hinge or bendable portion 48 at its bottom, each of which might be an integral hinge, one or more living hinges or simply a thinned portion of material that enables bending of the wall 36 relative to the rigid portion 12 and the bottom flap 16. The bendable portions 46, 48 enables variability in the angular orientation of the rigid portion 12 relative to the top and bottom flaps 14, 16 and thus relative to the rear surface 26 of the TV 24 and surface of the wall or piece of furniture 30 to which the top and bottom flaps 14,16 are attached, respectively. The thin wall 36 preferably is dimensioned to have a height corresponding to the thickness of the top shelf 44 of conventional furniture (see FIG. 6). Exact correspondence to the thickness of a top shelf 44 is not always possible due to different manufacturers having different furniture with top shelves of different thickness, but an approximate dimensioning of the height of the thin wall 36 to the top shelf will improve the securing of the stabilizer 10A and its functionality.

All features and uses for stabilizer 10 are equally applicable to stabilizer 10A, and vice versa, aside from the differences in the design relating to the manner in which the bottom flap 16 is attached to the rigid portion 12.

Stabilizers 10, 10A may be made of any suitable plastic material and may have uni-body construction. It is believed that the only real effective material for one piece living hinges is polypropylene. This means that they can be formed from one type of material and manufactured by a suitable material formation technique to have the shape and form as disclosed and/or illustrated in this application. For example, the stabilizers 10, 10A may be made of polypropylene, although NYLON® plastic might also be suitable, but this identification of materials does not limit the invention. Alternatively, mechanical hinges may be used and hinge means will therefore be considered any type of hinge that enables relative rotation or pivoting between the parts connected to and on opposite sides of the hinge.

Advantages of the stabilizers 10, 10A are numerous. First, whereas, most or all current webbing straps for TVs are screwed into a defined threaded screw location on the rear surface 26 of the TV 24, stabilizers 10, 10A provides unlimited locations, both singularly or as a plurality, depending on the size of the TV 24. The further back the TV 24 is placed on the TV stand as an example of a piece of furniture 30, the higher will be engagement of the stabilizer placement onto the TV 24. Conversely, the further away from the rear surface of the TV stand and closer to the leading edge of the TV stand, the lower will be the engagement of the stabilizer placement onto the TV 24.

In most if not all instances, placement of the bottom flap 16 will be on the wall in back of the TV stand, or the bottom surface of a top shelf of the TV stand (if and when present), or the back wall behind the TV stand in which case the stabilizer 10 is installed independent of the TV stand. A pivot point defined between the uppermost hinge between the bottom flap 16 and the rigid portion 12 can remain consistent, irrespective of the placement of the TV 24 on the upper surface of the piece of furniture 30. The angle directed to the TV 24 of the reinforced, substantially rigid portion 12 is adjusted accordingly.

At its core, the invention is a rigid structure that is securely fastened to the TV 24 on one side, and fastened likewise to one of at least three different surfaces or configurations, namely, a back wall of the piece of furniture 30 on which the TV 24 is placed, a back bottom surface of a piece of furniture 30 on which the TV 24 is placed, and a wall behind the piece of furniture 30 on which the TV 24 is placed. Each of these is considered the location 28 at which the bottom flap 16 is attached.

As to the manner in which the top and bottom flaps 14, 16 are attached to the TV 24 and location 28 respectively, the first and second attachment means to perform this attachment, 40, 42, respectively, may be any known means to form a strong bond between two surfaces. In a preferred embodiment, the attachment means 40, 42 comprise adhesive-backed VELCRO® (hook and loop fasteners, or similar product) or double-sided or double-faced professional grade foam tape. The attachment means 40, 42 could be a type of permanent attachment in that it is extremely difficult to remove. The force against separation must be strong enough to prevent a toddler from grabbing the TV 24 and pulling it forward and allowing the TV 24 to tip over. Adhesive and VELCRO® is virtually impossible to remove and professional grade hook and loop fasteners are very tough to separate.

First and second attachment means 40, 42 may thus have two components. One attached to the stabilizer 10, 10A and one attached to the TV 24 or piece of furniture 30. FIGS. 1-6 show this as components 40A, 40B and 42A, 42B.

The size of the top flap 14 and bottom flap 16 may vary depending on the desired surface area of the first and second attachment means 40, 42. In one embodiment, the top and bottom flaps 14, 16 each have a substantially planar surface on that side facing the TV 24 or the location 28 on the piece of furniture 30. This planar surface may have a size of about 4 inches square and can receive a 3 inch square or 4 inch square or 3×4 inch piece of adhesive-backed VELCRO®.

Note that the bottom flap 16 can be provided with planar surfaces on both sides because when attached to a rear wall portion of the piece of furniture 30 (see FIG. 3) or to the underside of a top shelf of a piece of furniture (see FIG. 6), the second attachment means 42 would be on the same side of the stabilizer 10, 10A as the first attachment means 40, i.e., the front-facing side. On the other hand, when attached to a rear wall behind the piece of furniture 30, the second attachment means 42 would be on the opposite side of the stabilizer 10, 10A as the first attachment means 40, i.e., the rear-facing side. The second attachment means 42 could be included in a kit with the remaining parts of the stabilizer 10, 10A to enable the installer to install the second attachment means 42 on the front-facing or rear-facing planar surface of the bottom flap 16 depending on the specific installation.

Another advantage of the stabilizer 10, 10A is that they are reusable when replacing the current TV, or repositioning the existing TV. To accomplish that, the side opposite the mounting TV side will require replacement of the attachment means 40, 42 as that engagement should and will be hard to remove, although one may consider removing it with Goo Gone® or other adhesive removing products.

Another advantage of the stabilizers 10, 10A is that they do not require screws to be attached to the TV 24. Currently, most or all TV tip-prevention products require screwing into the threaded holes on the TV as well as that of the back of the TV cabinet or other piece of furniture on which the TV is supported. Most require two webbed components that allow for tightening the slack. Lack of screws enables the top flap 14 to be connected to almost any location on the rear surface of the TV 24. With screws, installation is limited to the placement of the webbing straps. By contrast, with both embodiments of the present invention, placement can be centered, or off centered should the installer choose to use more than one stabilizer.

Indeed, it is now possible to provide multiple stabilizers 10, 10A to connect the TV 24 to the piece of furniture 30. If two stabilizers 10, 10A are provided, they can be appropriately spaced apart from each other and apart from the lateral edges of the TV 24 to provide an improved securing of the TV 24 to the piece of furniture 30. As to suggested placements, for TVs in the 55 inch or less range may require only one stabilizer 10, 10A, while larger TV can ideally use two, evenly spaced apart stabilizers 10, 10A, spaced apart about 25 inches to about 35 inches, for example.

Another advantage over the webbing is the rigidity of the rigid portion 12 and the optional raised ribs which constitute reinforcement means that resist back-flexing of the TV 24. This minimizes and should eliminate a rocking condition as in conventional stabilizers including webbed straps, which condition reduces the recoil one may experience should a toddler push hard onto the TV 24, which when recoiled can cause possible disengagement of the webbed strap. Moreover, there is simply no need for adjustable webbed straps since the stabilizer 10, 10A fits most if not all TVs 24.

Yet another advantage is that installation of the stabilizer 10, 10A to a TV can be accomplished in seconds, as opposed to the timely installation of prior art TV stabilizers that require screwing and pulling the slack to make the TV stand secure.

It is preferred that stabilizers 10, 10A be molded as one piece with weakened living hinges. However, it is also possible to make the stabilizers 10, 10A in sections with mechanical hinges. Furthermore, the stabilizers 10, 10A can be a combination of mixed materials where the main stabilizer member is steel, and the hinged parts are hinged by pin plastic components. The central area, if steel, will further resist the forward and backing rocking of larger, flat screen TVs. This forward and backward motion (primarily backward) can cause a recoil that may rebound forward and thus disengage mounting support of conventional TV stabilizers with webbing straps resulting in potential injuries.

The stabilizers 10, 10A can be sold along with TVs. They can be tailored, designed or configured for specific TVs and sold by the manufacturers of such TVs to consumers when purchasing the TVs.

Methods for stabilizing a TV, representative of any type of component that is to be placed onto a piece of furniture, are mentioned above. Generally, in such an exemplifying, non-limiting method, the stabilizer as described above is provided, the top flap is attached to a rear surface of the component using first attachment structure on a planar surface of the top flap, and the bottom flap is attached to the piece of furniture or wall behind the piece of furniture using second attachment structure on a planar surface of the bottom flap (of which there may be two on opposite sides of the bottom flap and which one is used depends on the installation, i.e., whether to the furniture or wall). The order of attachment of the top and bottom flaps is not critical in the invention. The television is positioned appropriately to ensure a secure placement on the furniture.

When stabilizer 10A in particular is used, the bottom flap is attached to the piece of furniture by bending the thin wall 36 over the top shelf 44 of the piece of furniture such that the bottom flap 16 is alongside an underside or lower surface 50 of the top shelf 44 and attaches to the underside or lower surface 50 of the top shelf 44 via the hook and loop fasteners or double-sided or double-faced tape, or other comparable attachment structure or attachment means. As used herein, attachment structure may be considered to be attachment means that include all of the disclosed attachment techniques and equivalent and comparable techniques and products. This same installation is also applicable for stabilizer 10 in which case, the appropriate living hinge 34 is selected about which to bend the bottom flap 16 relative to the rigid portion 12 to provide for a tight fit of the bottom flap 16 and region of hinges 34 against the top shelf 44.

Also, when stabilizer 10A is used, since the bottom flap 16 is provided with a planar surface on both sides, it is necessary to select which planar surface to apply the second attachment structure, e.g., VELCRO® type hook and loop fasteners, to depending on whether the bottom flap 16 is to be attached to the piece of furniture (in which case, the attachment structure would be applied to the same, front side of the stabilizer 10A as the first attachment structure for the top flap 14 is applied to) or to the wall (in which case, the attachment structure would be applied to the opposite, rear side of the stabilizer 10A as the first attachment structure for the top flap 14 is applied to).

Referring now to FIGS. 7 and 8, the stabilizers 10, 10A can be used to stabilize a piece of furniture 60 by attaching the piece of furniture 60 to a wall 62 (as an example of a vertical structure) behind the piece of furniture 60. In the following description, a dresser will be used as an example of a piece of furniture 60 with which the stabilizers 10, 10A can be used. However, use of the stabilizers 10, 10A with the depicted dresser is in no way intended to limit the invention and use of the stabilizers 10, 10A with other types and configurations of dressers and other types of furniture is also considered part of the invention. For example, the piece of furniture could be a large television of the types mentioned above.

FIG. 7 shows the dresser 60 with its uppermost drawer 64 open and a child 66 pulling the open drawer 64 which will cause the dresser 60 to tip over and potentially injure or kill the child 66. This situation is remedied by the invention.

Specifically, as shown in FIG. 8, a stabilizer 10, 10A in accordance with the invention is attached at one end region 68 to a rear surface 70 of the dresser 60 and at an opposite end region 72 to the wall 62, e.g., to a floorboard 74 or a bottom molding of the wall 62. The stabilizer 10, 10A functions in the same way as described above in that it restricts the tipping movement of the dresser 60 in view of the mounting to the wall or wooden baseboard 62. This mounting includes an attachment of the end region 68 to the rear surface 70 of the dresser 60 by attachment structure disclosed herein and attachment of the end region 70 to the wall or wooden baseboard 62 by attachment structure disclosed herein.

Figure 8A:
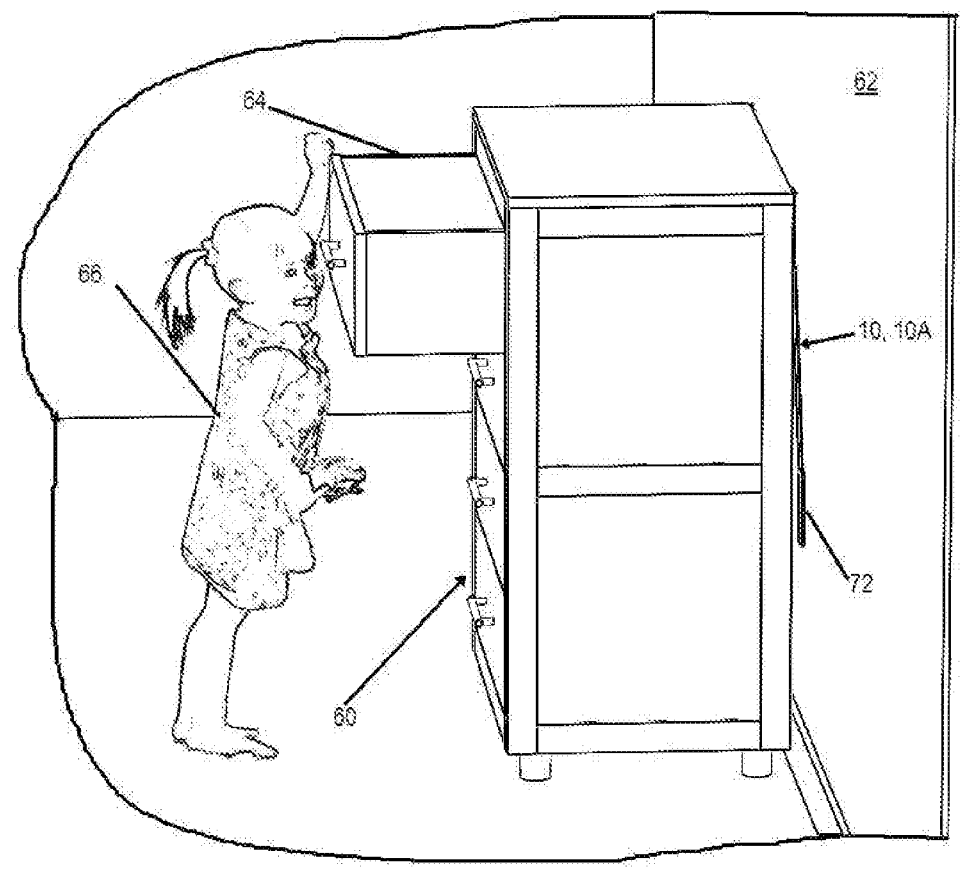
FIG. 8A is a view of the stabilizer of FIG. 1 shown securing a piece of furniture, namely, a dresser, at a more preferable upper position to a wall to address the tipping situation shown in FIG. 7.

FIG. 8A shows a preferred positioning of the stabilizer 10, 10A in accordance with the invention wherein it is attached at one end region 68 to an upper portion of the rear surface 70 of the dresser 60 and at an opposite end region 72 to the wall 62 (not required to be and unlikely to be at the bottom of the wall 62). It is highly desirable to attach the end region 68 to a location at, flush with and/or as close as possible to the upper edge of the rear surface 70 of the dresser 60 because this will optimally prevent tipping where it starts, i.e., a dresser 60 begins to tip from the top. That is, with the positioning of the stabilizer 10, 10A as shown in FIG. 8A, resistance to tipping will begin immediately because the end region 68 is flush with the upper edge of the rear surface 70 of the dresser, 60, i.e., at the top of the dresser 60.

Figure 9:
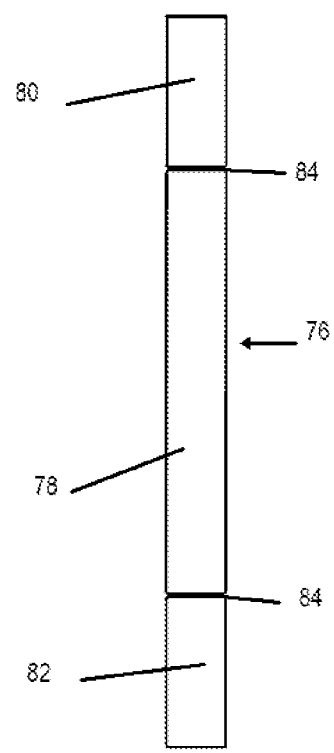
FIG. 9 is a front view of another embodiment of a stabilizer in accordance with the invention that can be used to secure a TV or piece of furniture to a wall.
Figure 10:
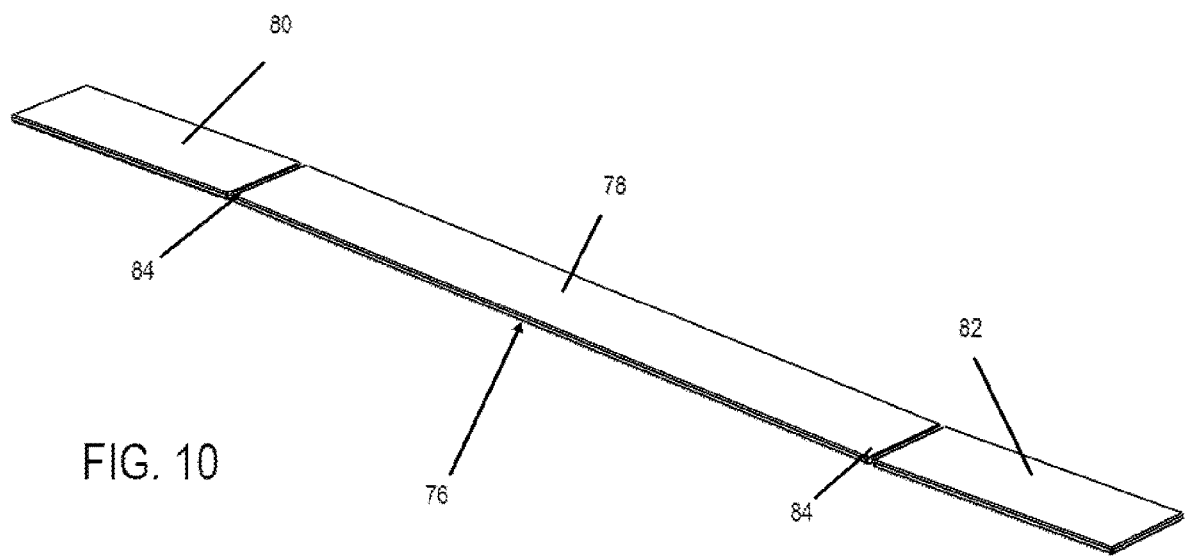
FIG. 10 is a side view of the stabilizer shown in FIG. 9.

FIGS. 9 and 10 show an alternative stabilizer 76 that may be used to secure the dresser 60 to the wall or wooden baseboard 62 instead of stabilizers 10, 10A as shown in FIG. 8. Stabilizer 76 comprises an elongate, rigid central portion 78, planar or otherwise, and two end regions 80, 82 at opposite ends of the central portion 78 that are hingedly connected to the central portion 78. There may be only a single hinge 84 between each end region 80, 82 and the central portion 78, or multiple hinges. If a single hinge is provided, the hinge 84 may be connected at one end to the central portion 78 and at the opposite end to the adjacent edge of the end region 80, 82, and may be an integral or incorporated living hinge or weakened hinge.

The central portion 78 may function as a supporting strip that may be made of plastic or metal, or even from cloth or as a fabric strap. Each end region 80, 82 may have a plate-like form and includes or is configured to accommodate attachment structure to enable attachment of the end region 80, 82 to the rear surface 70 of the dresser 60 or the exposed surface of the wall 62, respectively. Once attached, the stabilizer 76 provides resistance to the dresser 60 to tip forward.

This attachment structure may be double-sided adhesive or cooperating/complementary hook and loop fasteners, such as VELCRO® for example, or other equivalent or comparable attachment structure. When the stabilizer 76 is symmetrical, it will not matter which end region 80, 82 attaches to the rear surface 70 of the dresser 60 or to the wall 62.

In one embodiment, the stabilizer 76 may be a resilient strip of plastic with missing portions providing weakened hinges to provide positive surface to surface engagement. With such a construction, it is possible that the stabilizer 76 can resist tipping of a dresser with the force of about 90 to about 120 pounds or more pounds. As an example, the stabilizer 76 may be Polypropylene, NYLON® or ABS plastic strips that are about 24 inches long, about 2 inches wide and about ⅛ inch thick. For injection molding, since the weakened living hinges 84 preferably need to bend a little, the stabilizer 76 can likely be molded in an assortment of plastic substrates. Preferable to provide for suitable living hinges would be polypropylene. However, the stabilizer 76 could also be fabricated with living hinges from ABS or nylon.

One weakened living hinge on each end of the stabilizer 76 is preferable, but not exclusively required so long as the stabilizer 76 is flexible at some point along its length. An alternative to the living hinge would be a strap in the middle. Another alternative of the stabilizer 76 includes three pieces with mechanical hinges between adjacent pieces. Thus, although a preferred embodiment has a single strip or central portion with two weakened living hinges on each end leading to end region configured to accept hook and loop fasteners or other attachment structure, this is not limited and other variants are envisioned and considered part of the invention.

Attachment of the end region 82 to the floorboard 74 is one possibility as such a floorboard 74 is often at the bottom of the wall 62 (see FIG. 11), adjacent the floor on which the dresser 60 is resting, and has potentially better strength than the wall 62, especially if the wall 62 is a sheetrock wall.

The width of the stabilizer 76 may vary with a wider stabilizer having more tip-resistance. The stabilizer 76 may have a length of about 24 inches and be about 2 inches wide. The adhesive material used at the end regions 80, 82 may have a size of about 2 inches by 4 inches. These dimensions are examples only and do not limit the invention.

Figure 11:
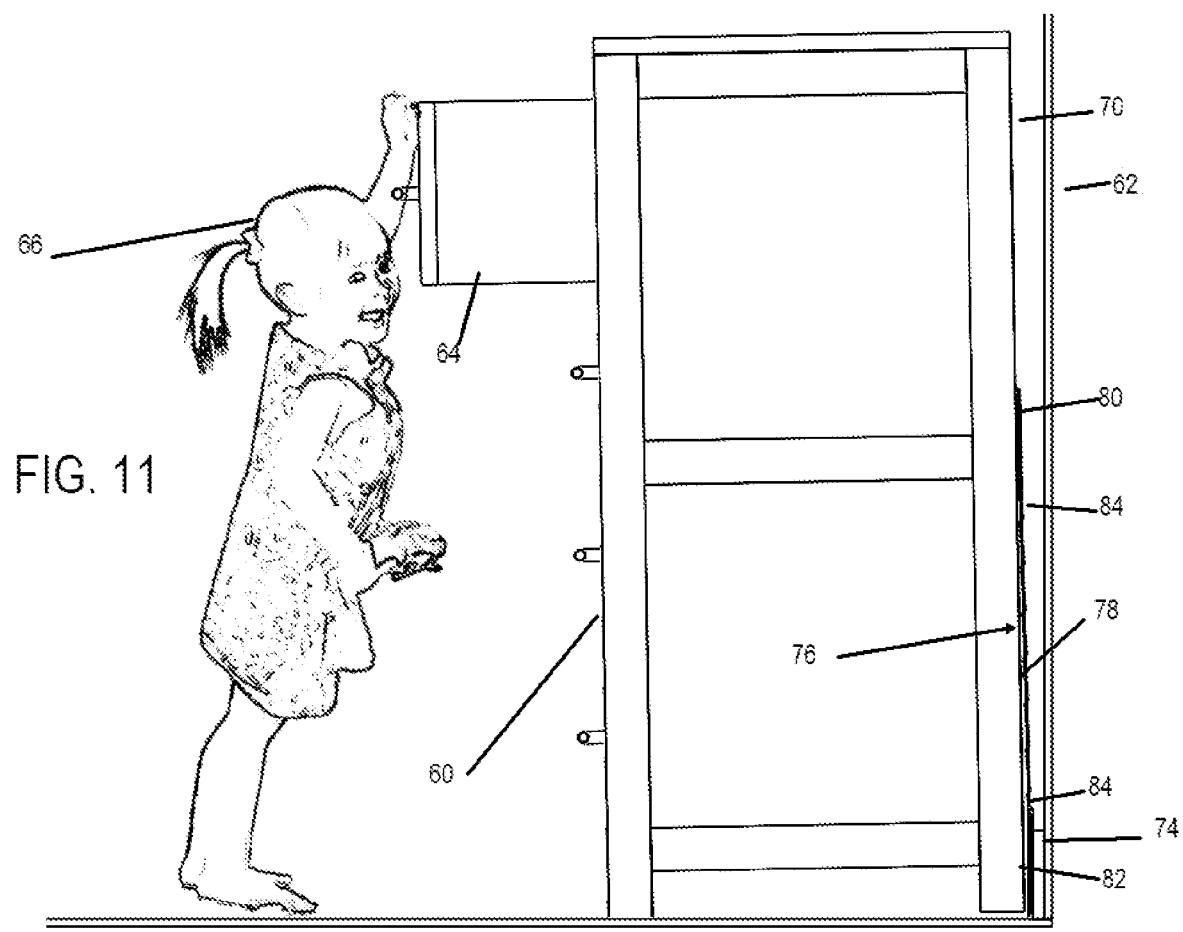
FIG. 11 shows the stabilizer of FIGS. 9 and 10 securing a piece of furniture, namely, a dresser, at a lower position to a wall to address the tipping situation shown in FIG. 7.

In use, two stabilizers 76 may be used for a single dresser 60 as shown in FIG. 11, one on each side of the dresser 60, e.g., one on the left side and one on the right side. This will improve tip-resistance because there would be positive engagement to the left and right dresser ends or end regions. Also, the length of the stabilizer 76 and its portions may vary as well as its positioning.

Selecting the position of the stabilizer 76 may entail placing the upper end region 80 high against the rear surface 70 of the dresser 60 in an approximate central area, if only one stabilizer is used (although two are preferable for added safety). If two are used, then locations on either side of the rear surface 70 would be selected.

In an exemplifying installation, and using complementary pieces of hook and loop fasteners as the attachment structure that connects the end regions 80, 82 to the rear surface of the dresser 60 and the wall 62, respectively, the installer would first attach hook fasteners to the wall 62 (see FIG. 11) at a desired location (using adhesive on the opposite side of a piece of the hook fasteners) and then press the loop fasteners of end region 82 to engage with the hook fasteners on the wall 62. The stabilizer 76 would be held upright as the dresser 60 is pushed against the wall. The installer would then mark the upper edge of the end region 80 on the rear surface 70 of the dresser 60 and pull the dresser away from the wall 62. The piece of hook fasteners is then attached to the rear surface 70 of the dresser 60 adjacent the marked line thereon (using adhesive on the opposite side of a piece of the hook fasteners). The dresser 60 is then pushed toward the wall 62 with the stabilizer 76 upright, and the piece of loop fasteners on the end region 80 engages with the hook fasteners on the rear surface 70 of the dresser 60 when the dresser 60 is close to or flush with the wall 62. The installer is able to press hook and loop fasteners at the end region 80 together with their hand just before the dresser 60 is against the wall 62. Once the stabilizer 76 is installed, tipping the dresser 60 forward is extremely difficult, especially by a child.

Figure 11A:
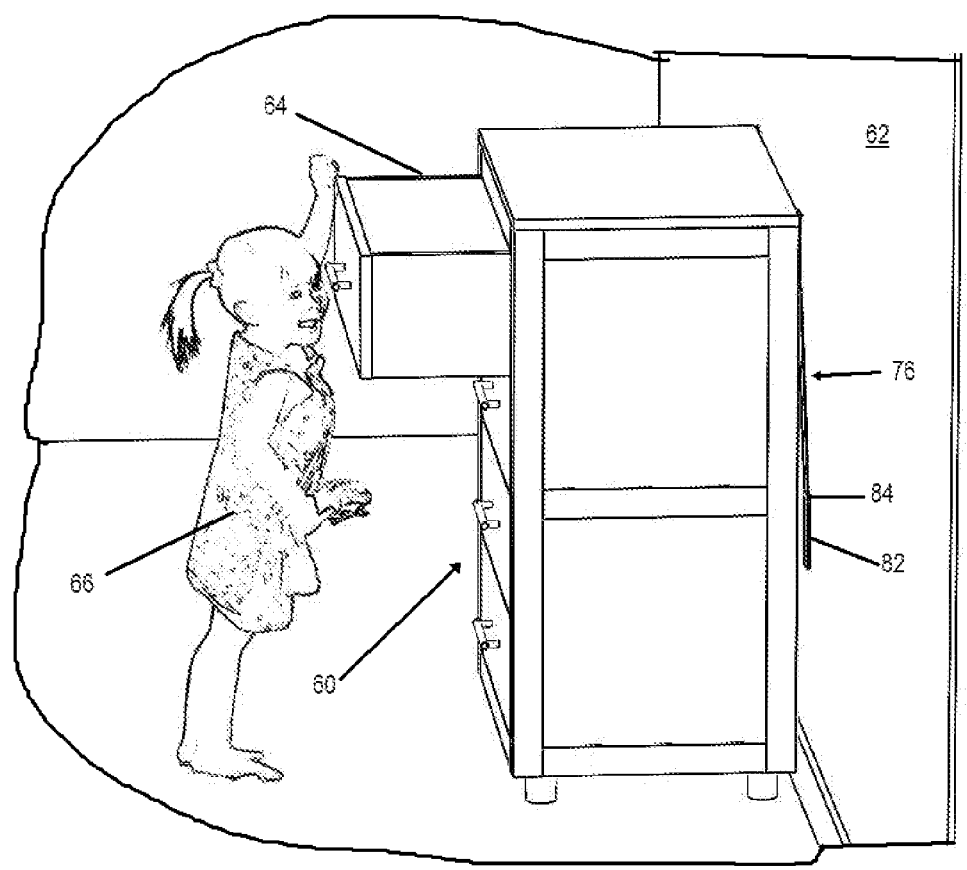
FIG. 11A is a view of the stabilizer of FIGS. 9 and 10 shown securing a piece of furniture, namely, a dresser, at a more preferable upper position to a wall to address the tipping situation shown in FIG. 7.

FIG. 11A shows a preferred positioning of the stabilizer 76 in accordance with the invention wherein it is attached at the upper end region 80 to an upper portion of the rear surface 70 of the dresser 60 and at the lower end region 82 to the wall 62 (not required to be and unlikely to be at the bottom of the wall 62). It is highly desirable to attach the upper end region 80 to a location at, flush with and/or as close as possible to the upper edge of the rear surface 70 of the dresser 60 because this will optimally prevent tipping where it starts, i.e., a dresser 60 begins to tip from the top. That is, with the positioning of the stabilizer 76 as shown in FIG. 11A, resistance to tipping will begin immediately because the upper end region 80 is flush with the upper edge of the rear surface 70 of the dresser, 60, i.e., at the top of the dresser 60.

The same positioning of a stabilizer to be at, flush with and/or close to the upper edge of the rear surface of the dresser is equally applicable to the other embodiments herein. Thus, all of the disclosed stabilizers could be positioned with the upper edge of that portion to be attached to the rear surface 70 of the dresser 60 to be flush with the upper edge of the rear surface 70. This will improve the tipping resistance of the stabilizer. Other positionings, although not possibly as ideal or optimal, are also within the scope of the invention Other installations techniques are also possible, and would be readily ascertainable by those skilled in the art to which this invention pertains.

FIGS. 12-16 show another embodiment of a stabilizer 76A in accordance with the invention which is similar to stabilizer 76 except that instead of having the hinges 84 at upper and lower edges of the central portion 78, at the lower edge of the end region 80 adjacent the central region 78 and at the upper edge of the end region 82 adjacent the central region 78, there are hinges 84A that are situated along the major surfaces of the end regions 80, 82. Also, since end portion or flaps 80, 82 are more likely to be in the form of rigid plates and will be referred to as plates 80A, 82A in the following explanation. All the plastic may be of the same substrate. It could be molded in polypropylene, ABS and NYLON®.

Figure 12:
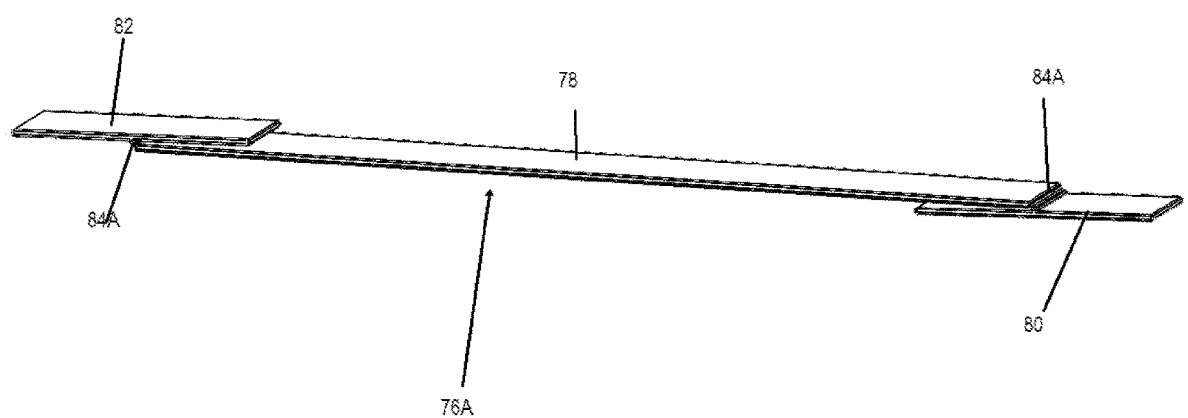
FIG. 12 is a perspective view of another embodiment of a stabilizer in accordance with the invention in a collapsed state which is also the state in which the stabilizer will be when installed.
Figure 13:
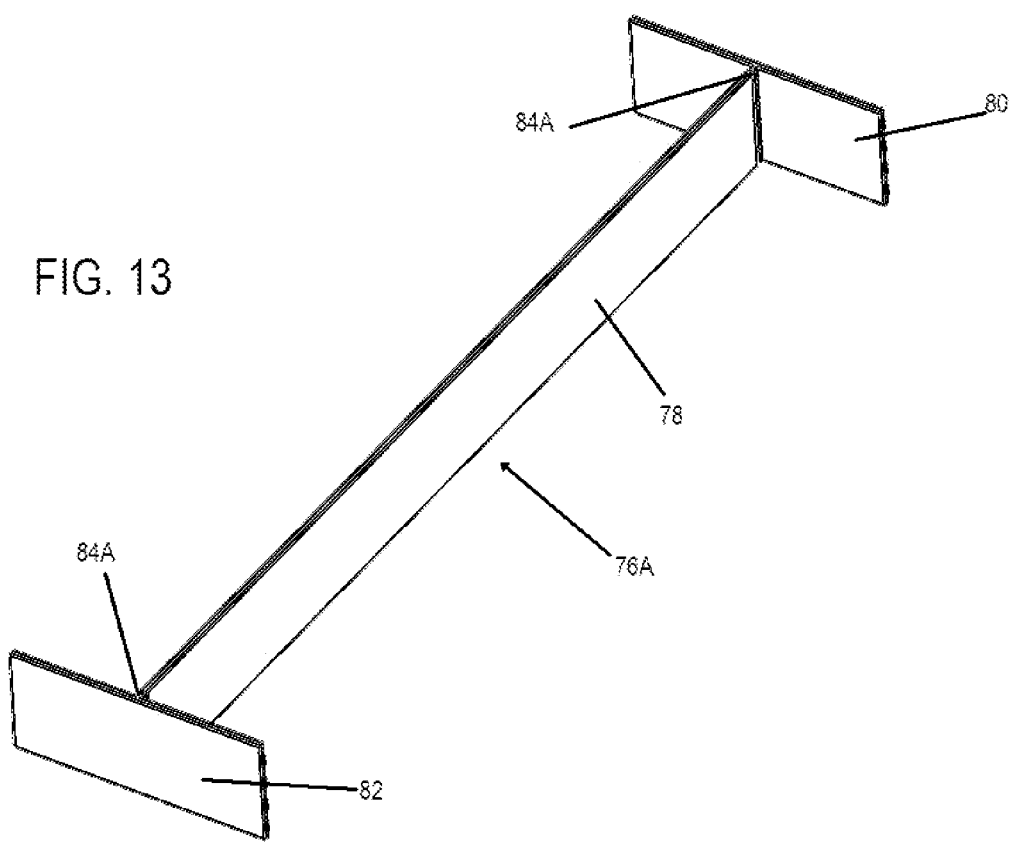
FIG. 13 is a perspective view of the stabilizer of FIG. 12 in an expanded state.
Figure 14:
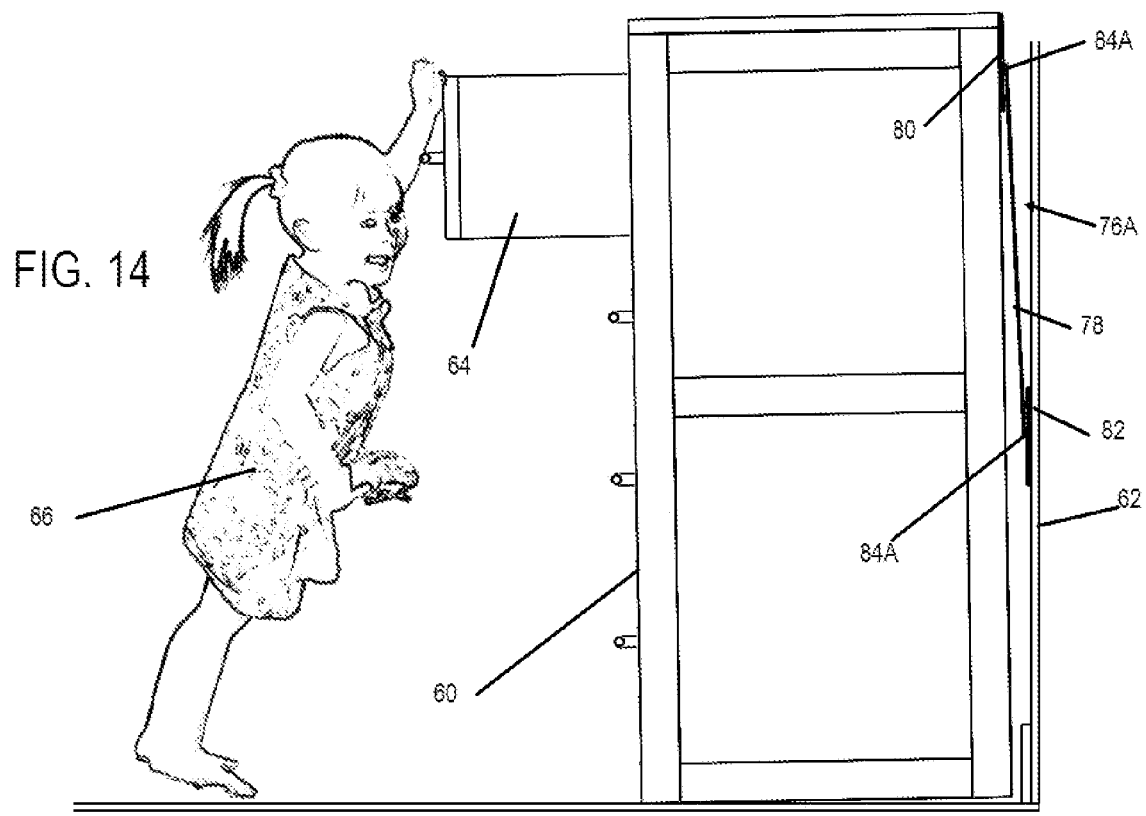
FIG. 14 is a view showing a child attempting to tip over a piece of furniture with the stabilizer of FIG. 12 installed in an upper positioning state, with such tipping being prevented.
Figure 15:
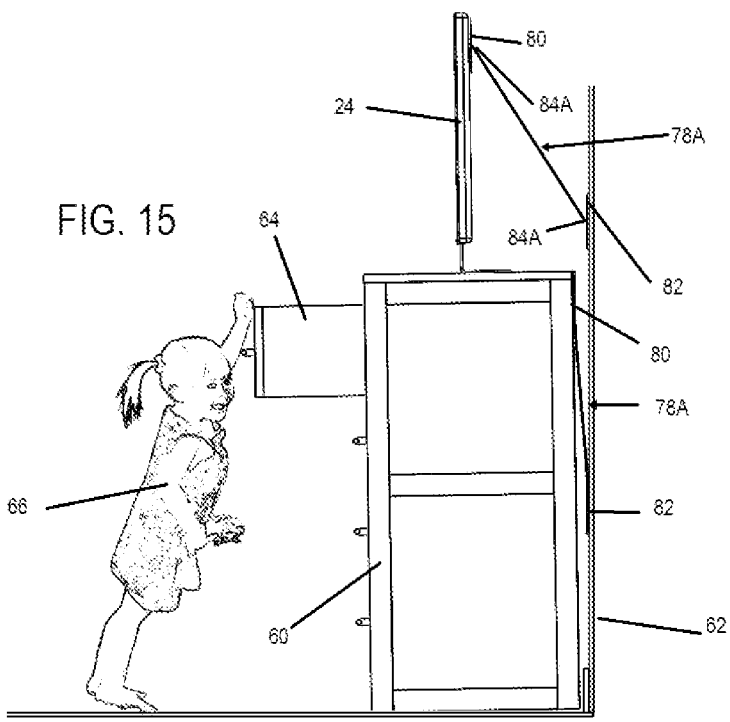
FIG. 15 is a view showing a child attempting to tip over a piece of furniture having a television thereon with the stabilizer of FIG. 12 installed in an upper positioning state in connection with the piece of furniture and another stabilizer installed in connection with the television, with such tipping of the piece of furniture and also the television being prevented.

When the hinges 84A are in a center or central region of the inner major surfaces of the plates 80A, 82A (as shown in FIGS. 12 and 13), the stabilizer 76A will have a generally I-shape as shown in FIG. 13 when expanded. This expanded state is obtained when the stabilizer is fully extended as a result of an attempt to tip over a piece of furniture such as a dresser 60 or a television 24 to which the stabilizer 76A is attached. Otherwise, when installed, the stabilizer 76A will have a collapsed state as shown in FIG. 13 or a partially extended state as shown in FIGS. 14 and 15.

Stabilizer 76A may have a one-piece construction or uni-body construction. The hinges 84A are formed integral with the central portion 78 and plates 80A, 82A, and as a result of the positioning of the hinges 84A in or near the center of the major surfaces of the plates 80A, 82A, the central region 78 is able to pivot in both directions relative to the plates 80A, 82A. The center of the major surface of the plates 80A, 82A (see FIG. 12) is that area midway between the upper and lower edges of the plates 80A, 82A, assuming the end portions have a rectangular or square shape (other shapes are also possible and not precluded). In this regard, the plates 80A, 82A may have a size of about 2 inches by 5 inches.

Positioning the hinges 84A in the center of the plates 80A, 82A is advantageous because the pivot area is central to the upper and lower edge of the end portions 80, 82 and when mounting to the piece of furniture (dresser 60) or television 24, there is improved resistance to delaminate from the wall 62 or other vertical support (in contract to the embodiment wherein the hinges 84 are at the upper or lower edges of the plates 80A, 82A, as in stabilizer 76). It will therefore be much harder to separate the plates 80A, 82A from the wall 62 since it will be forced from the middle making the resistance to initiating separation much greater.

Figure 16:
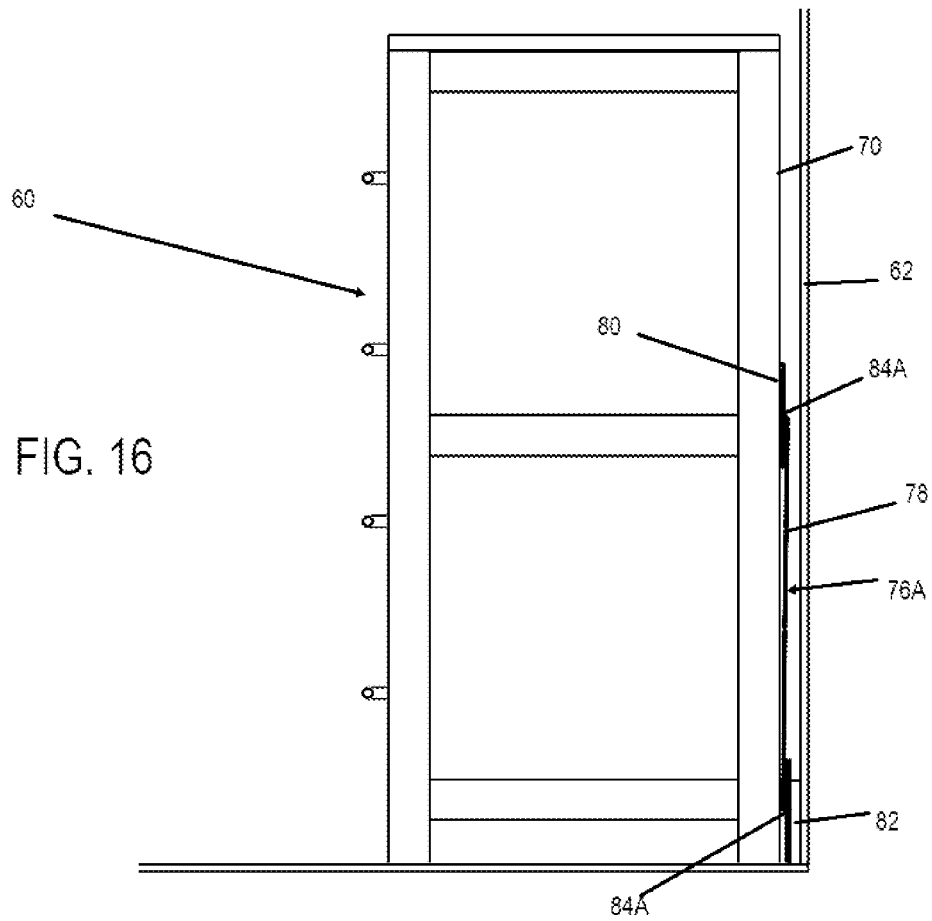
FIG. 16 is a view showing the stabilizer of FIG. 12 installed in connection with the piece of furniture in a lower positioning state.

As mentioned elsewhere herein, for the piece of furniture such as a dresser 60 or television 24 to be secured to the wall 62 or other vertical support surface there may be only a single stabilizer 76A, or two or more stabilizers 76A. When two stabilizers 76A are used, they can be positioned one on each end. An advantage is that while most dressers have cheap backs, by positioning the plate 80A or 82A of each stabilizer 76A near or at the edge of the dresser, the likelihood of engaging rigid side walls of the dresser, that are likely wood or even pressed wood, is increased. By engaging the side wall, it will be possible to grasp the 0.75 inch wood, as well as the back panel. The stabilizer 76A can be positioned to connect an upper region (plate 80A) of the stabilizer 76A close to the top to the rear surface 70 of the dresser 60 and the lower region (plate 82A) to the wall 62 (see FIGS. 14 and 15) or to connect a lower region of the rear surface 70 of the dresser 60 and engage the wooden baseboard of the wall 62 behind the dresser (FIG. 16). While the lower region could provide a wood-to-wood bonding, the upper region may provide a wood-to-painted wall bonding.

FIGS. 17-22 show another stabilizer 86 for the dresser 60 that hinders and ideally prevents tipping of the dresser 60 away from the wall 62 when force is exerted by a child. Stabilizer 86 includes two plates or side portions 88, 90 and a central hinged portion 92 that constitutes a limited expansion assembly. As used herein, a limited expansion assembly is a structure capable of expansion but only to a certain degree. The expansion is not unlimited and constrained to allow at most, only a minor amount of expansion (a minor amount of tipping). Moreover, the limited expansion assembly is not required to have multiple parts but can be formed from a single part, member or component while having different portions of this part, member or component function as needed to provide for limited expansion and the attachment or adhesion to the structure sought to be kept together with only limited separation therebetween.

Each side portion 88, 90 may have a plate-like form and at least its respective outer surface 88A, 90A is planar, this surface being the surface that is to be adhered or connected to the rear surface 70 of the dresser 60 or to the surface of the wall 62 or other vertical support against which the dresser 60 is to be placed. The side portions 88, 90 may thus be plates which are optimally parallel to one another. Their size may be about 2 inches by 5 inches, but one skilled in the art would appreciate that other sizes are possible and the particular size of the plates or side portions 88, 90 used in the stabilizer 86 depend on, for example, the size of the dresser 60 and the weight of the dresser 60.

Hinged portion 92 has a plurality of hinges including a first hinge 94 that connects the hinged portion 92 on one side to the inner surface 88B of the side portion 88 and a second hinge 96 that connects the hinged portion 92 on an opposite side to the inner surface 90B of the side portion 90. To optimize the strength of the stabilizer 86, the hinge 94 is ideally positioned in or close to a central region of the side portion 88 and similarly, the hinge 96 is ideally positioned in or close to a central region of the side portion 90. This positioning, although beneficial for maximal tipping prevention, is not critical to use of the invention. The first and second hinges 94, 96 may be living or weakened hinges.

Figure 18:
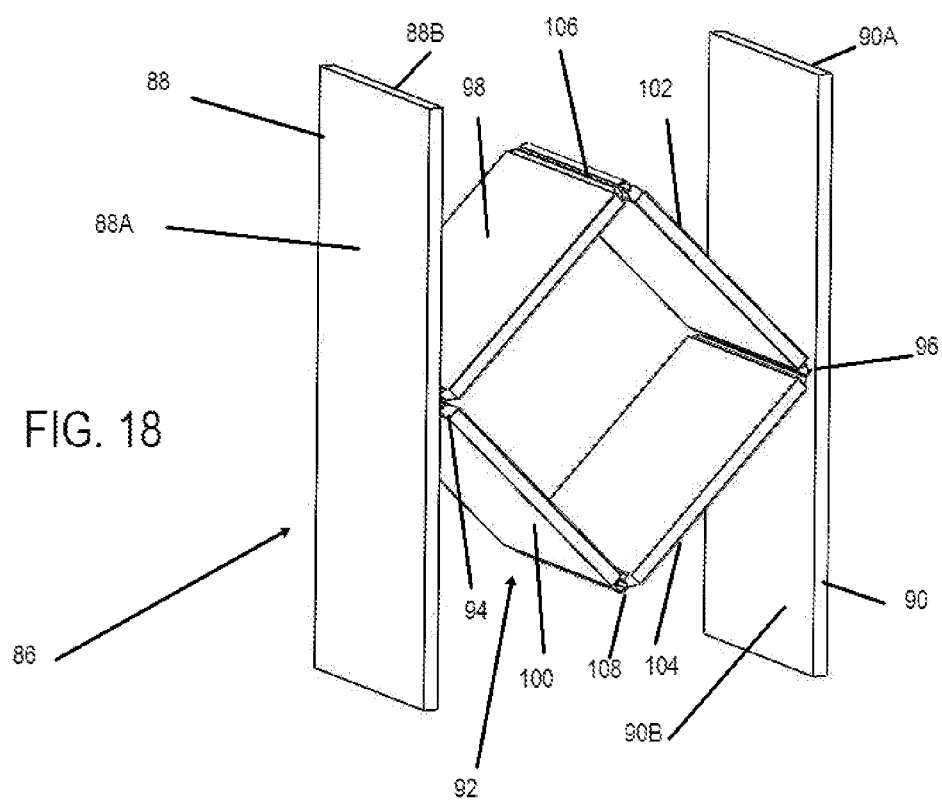
FIG. 18 is a view of the stabilizer of FIG. 17 shown in a partly expanded state.
Figure 19:
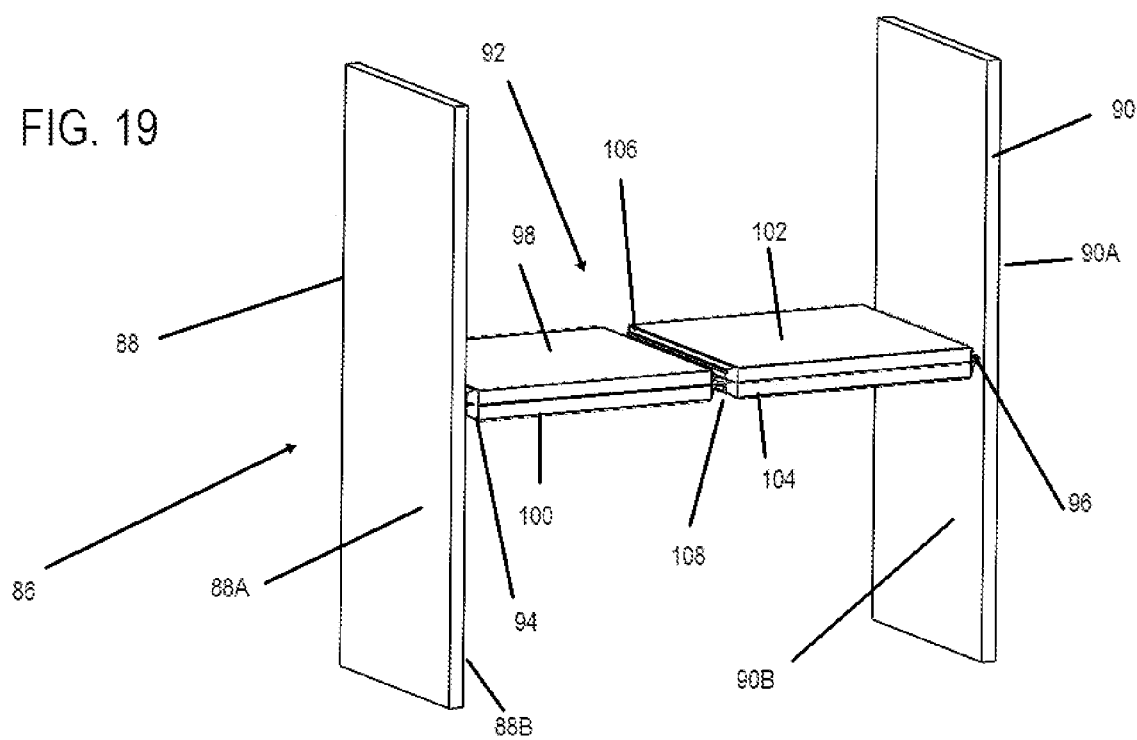
FIG. 19 is a view of the stabilizer of FIG. 17 shown in a fully expanded state.
Figure 20:
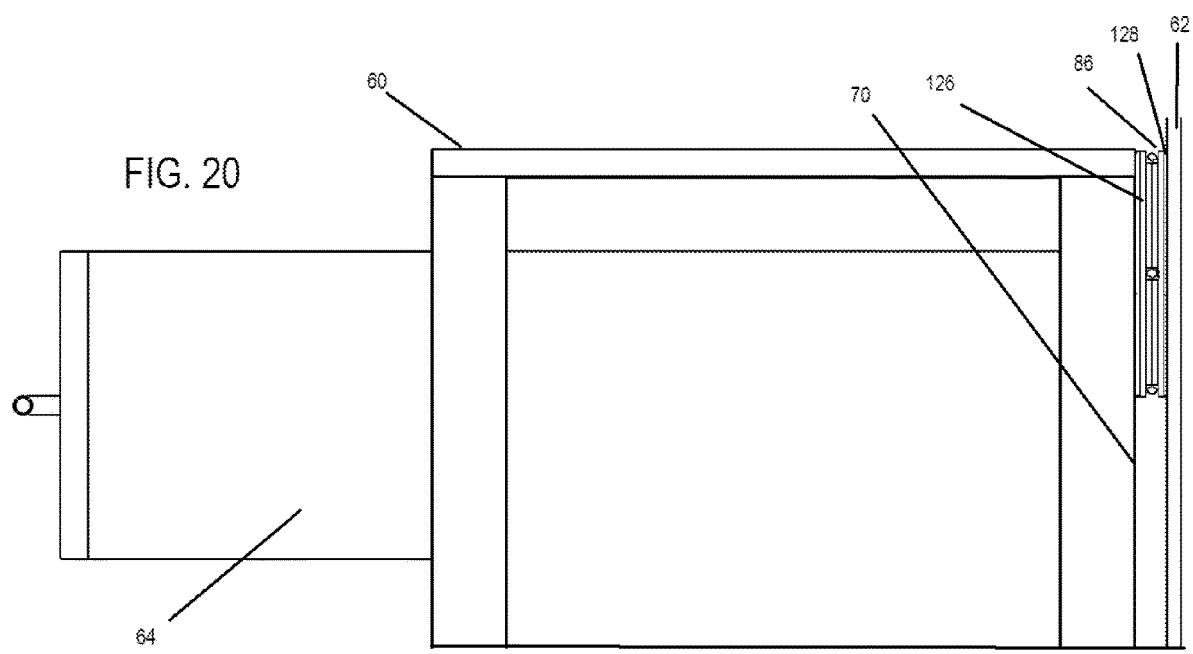
FIG. 20 is a view of the stabilizer of FIG. 17 shown in an installed state.

As best seen in FIGS. 18 and 19, hinge 94 connects the side portion 88 to two flaps 98, 100 on opposite sides of the hinge 94. Similarly, hinge 96 connects the side portion 90 to two flaps 102, 104 on opposite sides of the hinge 96. The hinged portion 92 further includes a third hinge 106 that connects the flaps 98, 102 on the same side of the hinges 94, 96 and a fourth hinge 108 that connects the flaps 100, 104 on the other side of the hinges 94, 96. Hinged portion 92 thus includes four hinges, although it is conceivable to include a different number of hinges.

Figure 17:
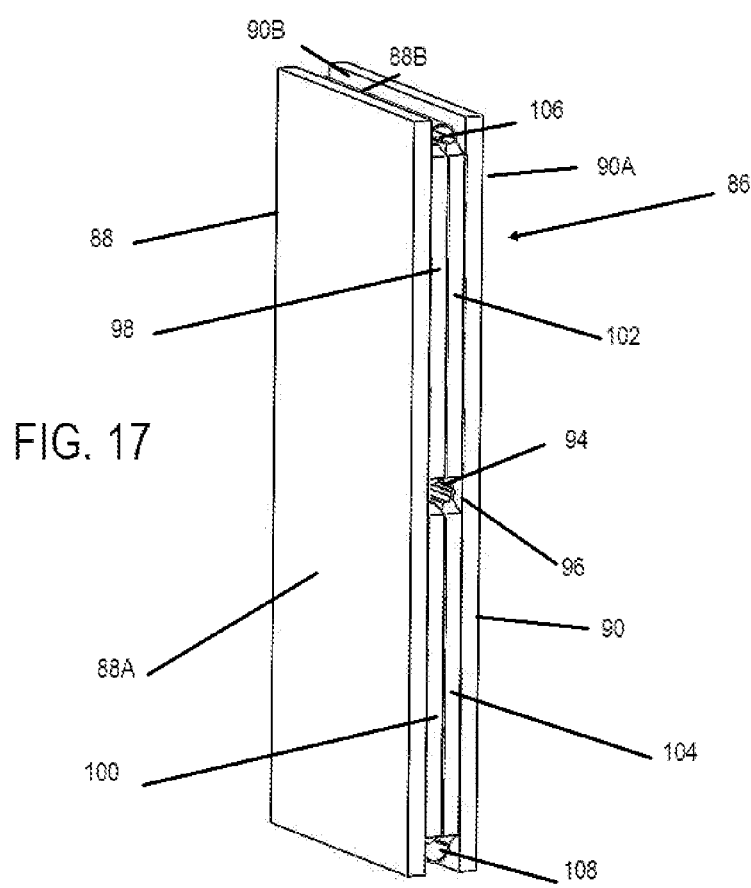
FIG. 17 is a perspective view of another embodiment of a stabilizer in accordance with the invention shown in a collapsed, use state.

The presence of the four hinges 94, 96, 106, 108 enables the stabilizer 86 to have the collapsed state shown in FIG. 17 in which its thickness may be a little as 0.5 inches. In this state, the flaps 98, 102 are adjacent and possibly against the inner surface 88B of the side portion 88, the flaps 100, 104 are adjacent and possibly against the flaps 98, 102, respectively, and the flaps 100, 104 are adjacent and possibly against the inner surface 90B of the side portion 90. This 0.5 inch collapsed state of the stabilizer 86 is approximately the same thickness as the baseboard or floorboard 74 that is commonly at the bottom of walls and therefore the dresser 60 can be pushed against the baseboard of the wall 62 and the stabilizer 86 would occupy the space between the rear surface 70 of the dresser 60 and the wall 62 at a location above the baseboard.

Hinges 94, 96, 106, 108 also allow the stabilizer 86 to have a limited expanded state shown in FIG. 19. In this expanded state, the stabilizer 86 will have a thickness of about 5 inches, depending the size and construction of the hinged portion 92 and will limit the forward tipping of the dresser 60 when the outer surface 88A of the side portion 88 is attached to the rear surface 70 of the dresser 60 and the outer surface 90A of the side portion 90 is attached to the wall 62.

Stabilizer 86 may have a unibody or one-piece construction integrating or incorporating the four hinges 94, 96, 106, 108 and flaps 98, 100, 102, 104.

In use, the stabilizer 86 would include or incorporate attachment structure on the outer surfaces 88A, 90A of the side portions 88, 90. As an example, double-sided adhesive material 126, 128 will be considered as the attachment structure and is applied to the outer surfaces 88A, 90A of the side portions 88, 90, and covered by a pull-off layer (see FIG. 20 in the installed state). The installer removes the pull-off layer from the adhesive material 126 on the side portion 90 and presses the stabilizer 86 against the wall 62 at a location that will be behind the dresser 60 when the dresser 60 is in the desired location. The installer then removes the pull-off layer from the adhesive material 126 on the side portion 88 and presses the dresser 60 toward the wall 62 and against the stabilizer 86, ensuring that the adhesive material 126 on side portion 88 adheres to the rear surface 70 of the dresser 60 (to provide the state shown in FIG. 20).

Figure 21:
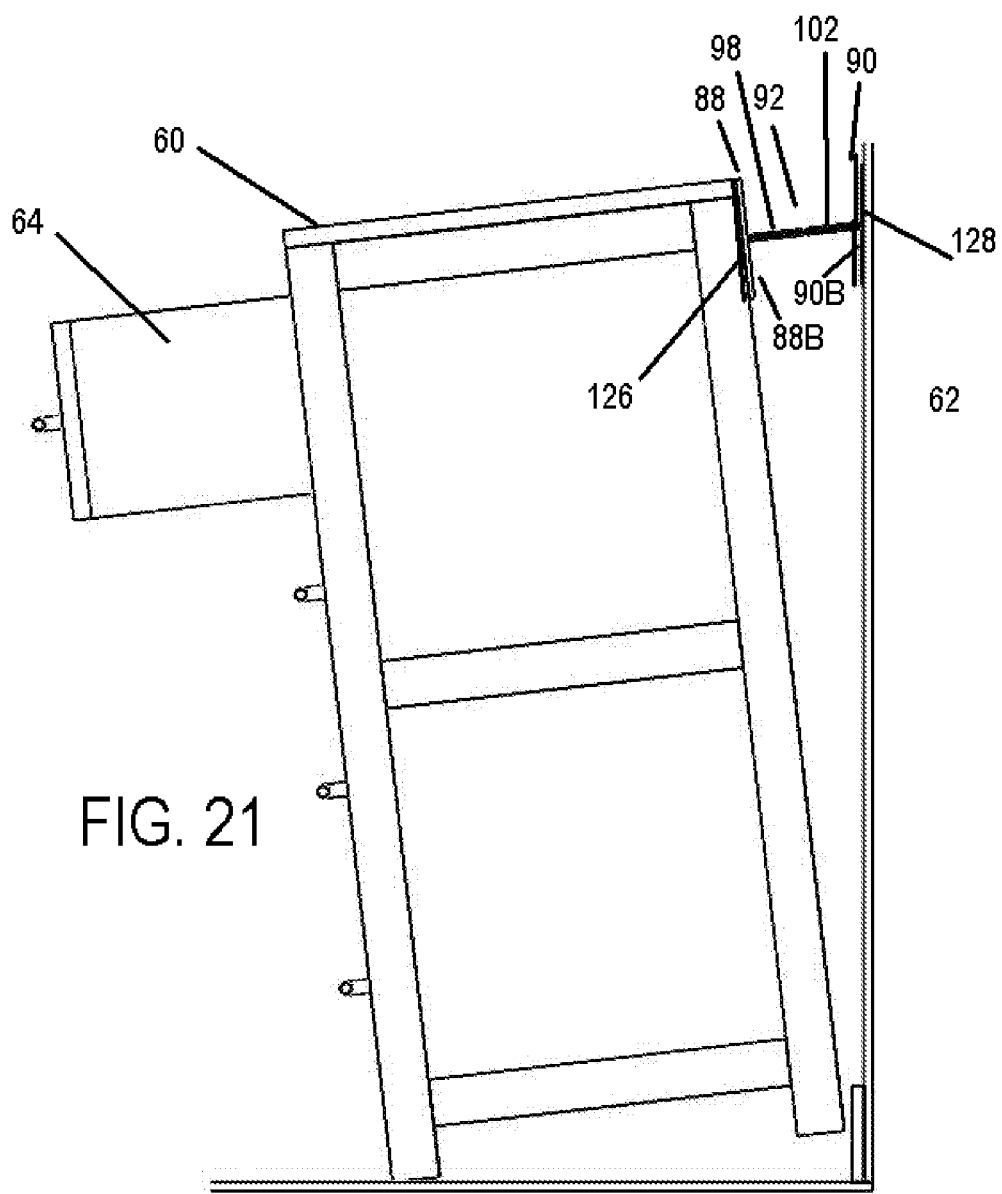
FIG. 21 is a view of the stabilizer of FIG. 17 shown in an installed, fully expanded state shown preventing tipping of the dresser.
Figure 21A:
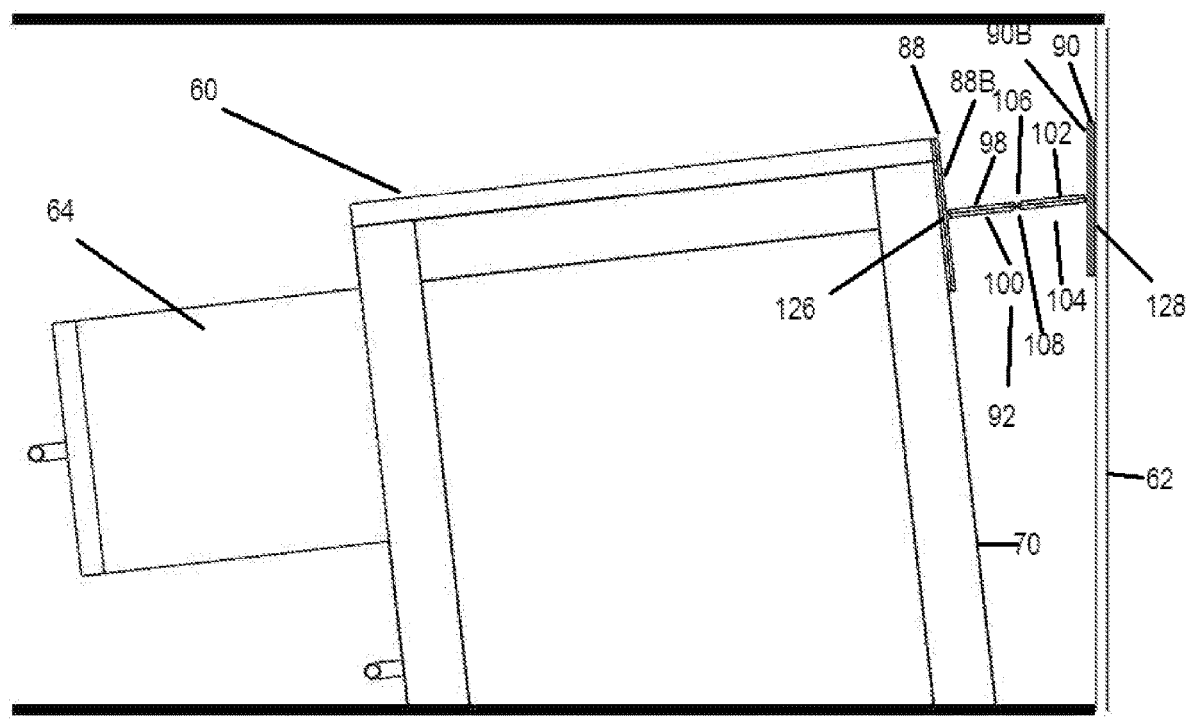
FIG. 21A is an enlarged view of the stabilizer in the state shown in FIG. 21.
Figure 22:
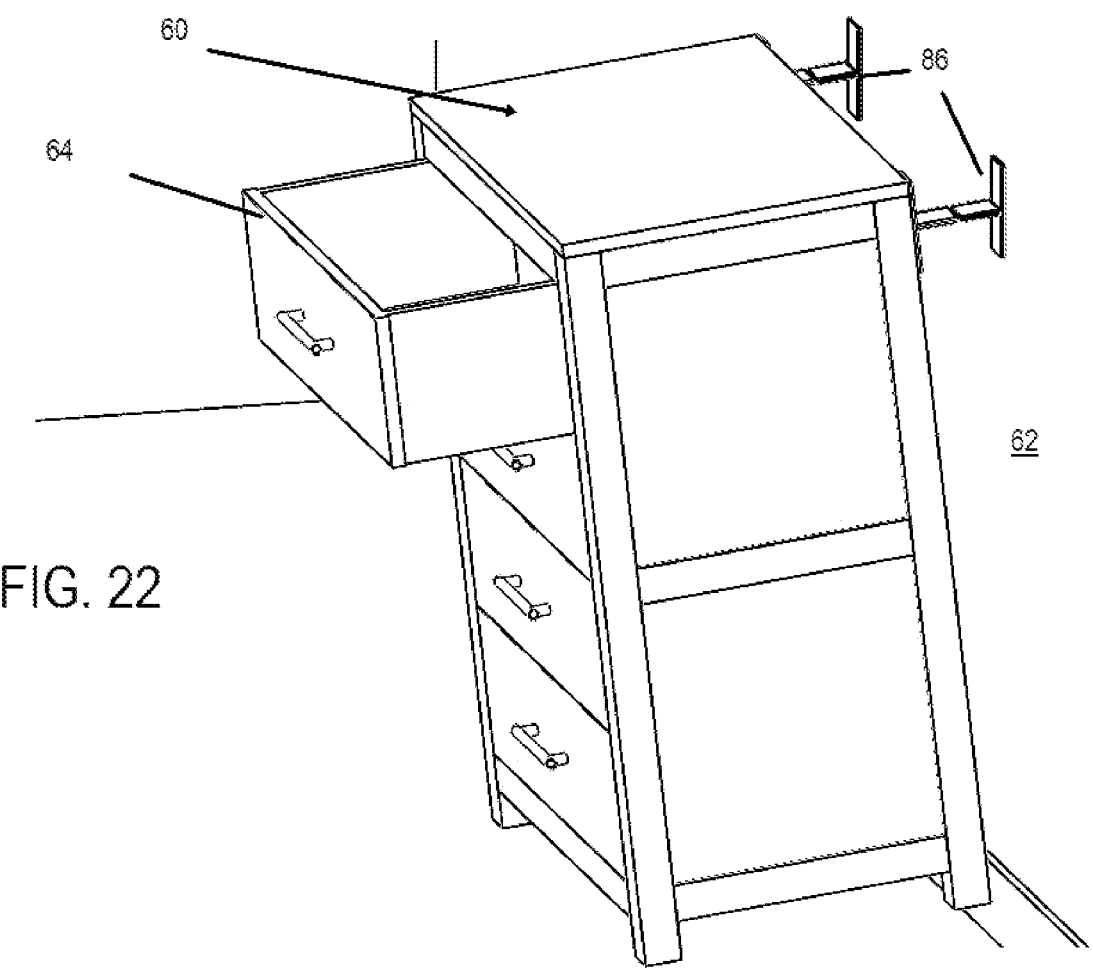
FIG. 22 shows two of the stabilizers of FIG. 17 in an installed state shown preventing tipping of the dresser.

The dresser 60 is thus firmly attached to the wall 62 and tipping is prevented. Any possible tipping is limited the maximum expansion of the hinged portion 92. FIG. 20A shows a state during tipping while FIGS. 21 and 21A shows a state where tipping of the dresser 60 is stopped at the fully expanded state of the limited expansion assembly, hinged portion 92.

When the stabilizer 86 is symmetrical, it does not matter which side portion 88, 90 is attached to the dresser 60 and which side portion 88, 90 is attached to the wall 62.

As an alternative to double-sided adhesive material 126, 128 (shown in FIGS. 20, 20A, 21 and 21A), the stabilizer 86 can include attachment structure on the outer surfaces 88A, 90A of the side portions 88, 90 and attachment structure of placement on the rear surface 70 of the dresser 60 and the wall 62, e.g., cooperating hook and loop fasteners with each piece of hook and loop fasteners having an adhesive side covered by a pull-off layer and the hook fasteners on or adhered to the outer surfaces 88A, 90A of the side portions 88, 90. The installer removes the pull-off layer from the loop fasteners of the attachment structure on the side portion 88 and presses the stabilizer 86 against the wall 62, the stabilizer 86 being secured to the wall 62 by the adhesive on the loop fasteners and the cooperating hook and loop fasteners on side portion 88. The installer then removes the pull-off layer from the loop fasteners of the attachment structure on the side portion 90, while these loop fasteners are engaged with the hook fasteners on side portion 90, and presses the dresser 60 toward the wall 62. The loop fasteners are secured to the rear surface 70 of the dresser 60 by adhesive. The dresser 60 is thus firmly attached to the wall 62 via the adhesive and the cooperating hook and loop fasteners, and tipping is prevented. Any possible tipping is limited by the maximum expansion of the hinged portion 92.

The stabilizer 86 would typically be situated at or close to the top of the dresser 60 for optimum usage and tipping prevention. It could also be situated at a different height but its optimum use for tipping prevention would not likely be attained. If a single stabilizer 86 is used, the stabilizer 86 should be placed in a central region of the dresser 60 near its top. If two stabilizers 86 are used, they could be placed at or proximate each lateral edge of the dresser 60 (see FIG. 22). When two are used, if one fails, i.e., the tipping force at that end of the dresser 60 is greater than the adhesive or securing force provided by the stabilizer 86 at that end of the dresser 60, then the other stabilizer 86 could prevent tipping. More than two stabilizers 86 may be used and positioning appropriately, as would be readily ascertainable by those skilled in the art to which this invention pertains.

Another alternative attachment structure to attach the first and second side portions 88, 90 to the rear surface 70 of the dresser 60 or wall 62 may be the combination of apertures in the side portions 88, 90 and screws dimensioned to pass through or thread through the apertures, or nails. Although using screws or nails may be more difficult than double-sided adhesive or hook and loop fasteners, it is possible. Other similar attachment structure may be used, for this embodiment as well as the other embodiments disclosed herein, and all of the above-mentioned attachment structure may be used for the other stabilizers disclosed herein.

FIGS. 23-28 show a variant of the stabilizer of FIGS. 17-22 wherein a different expansion assembly is used instead of the hinged assembly 92. In stabilizer 110, the expansion assembly 112 comprises a first plate 114, a second plate 116 and a bellows 118 between the first and second plates 114, 116. As shown, the bellows 118 is connected at its narrow end to the first plate 114 and connected at its wide end to the second plate 116. The first and second plates 114, 116 may be attached to, integrated into or incorporated into the bellows 118.

The bellows 118 is generally a structure that expands and contracts and to this end includes, for example, telescoping portions 120. With this structure, the bellows 118 enables the stabilizer 110 to have a largest thickness when the outer sides of the first and second plates 114, 116 are at a maximum distance from one another when fully expanded, shown in FIG. 25, and a smallest thickness when the outer sides of the first and second plates 114, 116 are at a minimum distance from one another when fully compressed or collapsed, shown in FIGS. 23 and 24. The stabilizer 110 would advantageously be stored and shipped when in the collapsed state.

Figure 25:
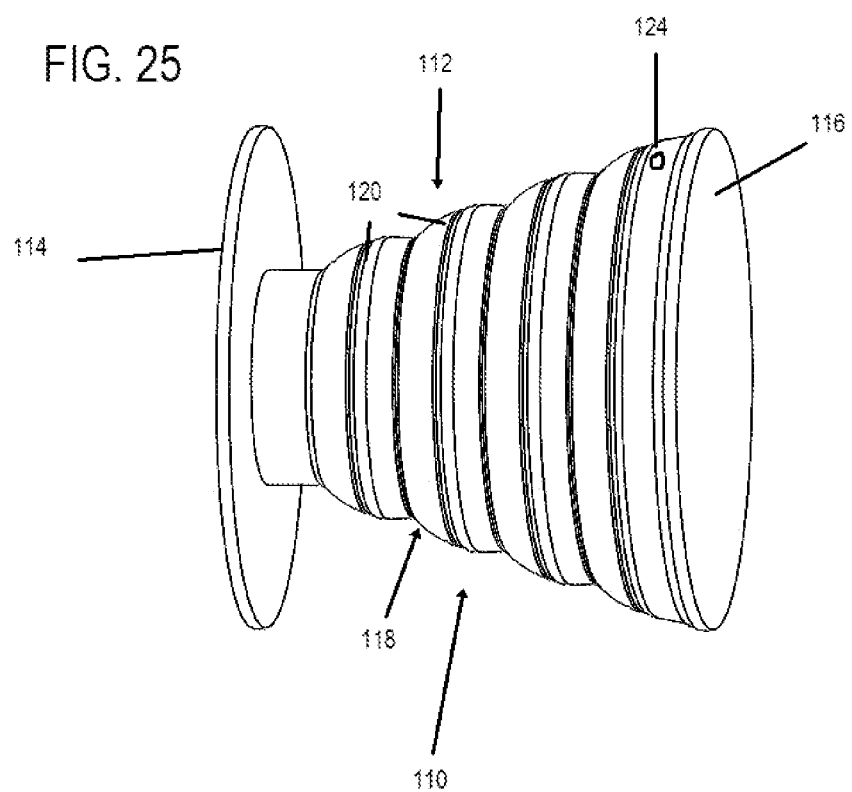
FIG. 25 is a perspective view of the stabilizer of FIG. 23 in an expanded state.

To enable and control expansion, the bellows 118 includes one or more small pinhole openings 124 communicating with the cavity 122 defined by the telescoping portions 120 to slowly allow air to enter or exit (see FIG. 25). The pinhole opening 124 may be in one of the telescoping portions 120 and/or in the fixed portions that support the telescoping portions 120 at one or both ends of the bellows 118. When air enters into the cavity 122, there is resistance to fill up with air. This slow resistance resists the jerk of the dresser 60 going forward and tipping. The bellows 118 can be like a diaphragm with the tiny pinhole allows the collapsible diaphragm to inhale and exhale. If there is a single tiny pinhole, inhaling and exhaling, i.e., flow of air into and out of the cavity 122 is slow, and this slow flow during the inhalation assists in the resistance provided by the stabilizer 110 to forwarding tipping of the dresser 60. Conversely, a larger opening will provide faster air movement into the cavity 122 which may be detrimental to possible delamination from either the wall 62 or dresser 60.

Additionally, the telescoping portions 120 may be made silicone or TPE (thermoplastic elastomer), and in view of the provided 360 degrees of surrounding material, they are strong. The ends of the bellows 118 may be overmolded in rigid plastic, (preferably ABS, Nylon® or Polycarbonate) which are substantially unbreakable.

Any known type of bellows may be used in the invention, with the sole criteria being that it can expand from a collapsed state and optionally collapse from its expanded state if repeated use is desired. Construction of a bellows with a plurality of telescoping portions 120 and structure to enable expansion and possible contraction or collapse are known and further description is not believed to be necessary to enable the invention to be made.

The plates 114, 116 may have respective outer surfaces 114A, 116A that are planar, this surface being the surface that is be adhered to the rear surface 70 of the dresser 60 or to the surface of the wall 62 or other vertical support against which the dresser 60 is to be placed. The plates 114, 116 may be parallel to one another. Their size may be about 2 inches by 5 inches, but one skilled in the art would appreciate that other sizes are possible and the particular size of the plates 114, 116 used in the stabilizer 110 depend on, for example, the size of the dresser 60 and the weight of the dresser 60.

The ends of the bellows 118 are preferably centered on the respective side plate 114, 116, although this is not required. By centering the ends of the bellows, the strength of the stabilizer 110 during full expansion is believed to be optimized. This positioning, although beneficial for maximal tipping prevention, is not critical to use of the invention.

Figure 23:
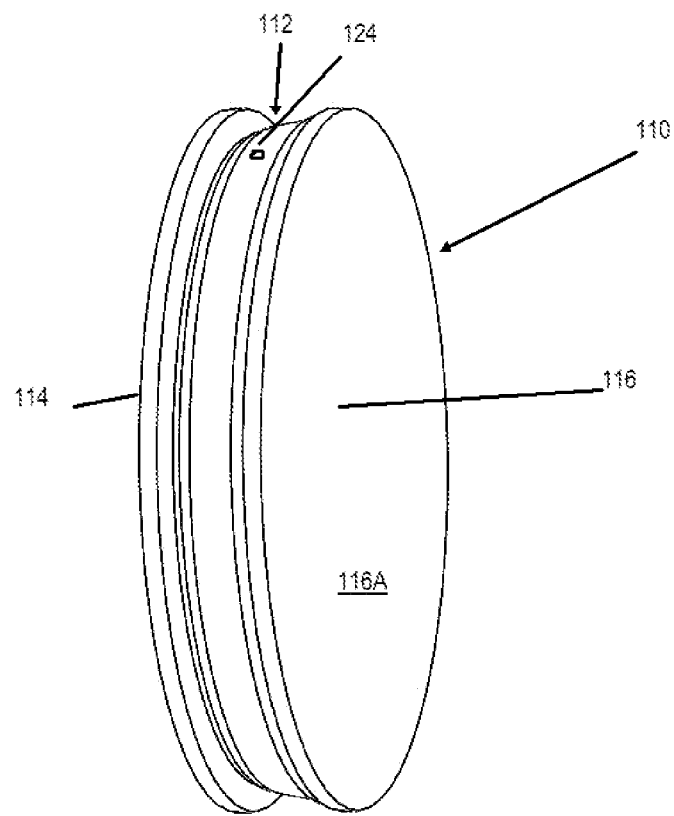
FIG. 23 is a perspective view of another embodiment of a stabilizer in accordance with the invention in an expanded state.
Figure 24:
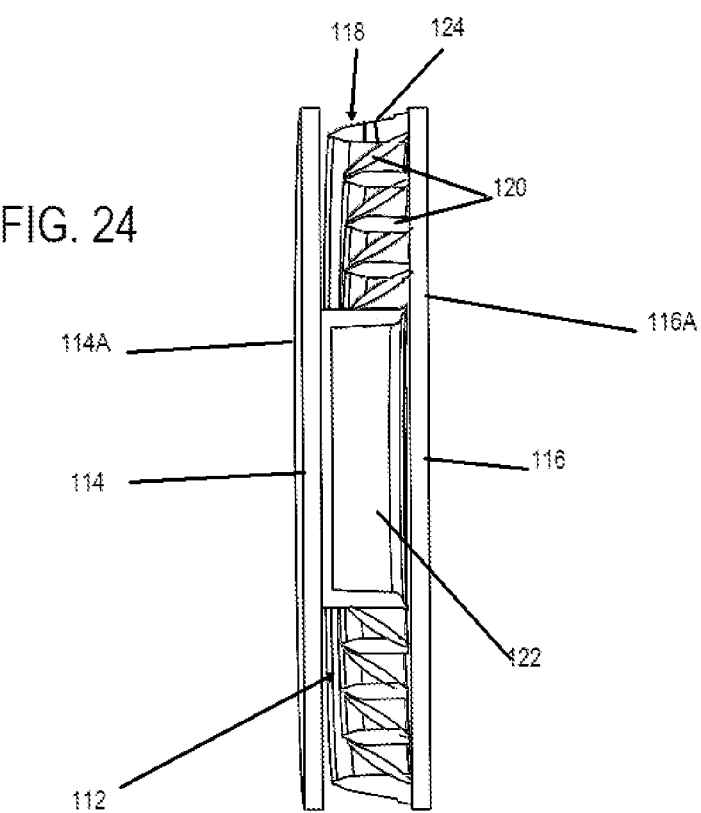
FIG. 24 is a cross-sectional view of the stabilizer of FIG. 23.

With bellows 118, the stabilizer 110 has its collapsed state shown in FIG. 23 in which its thickness may be a little as 0.5 inches. In this state, the telescoping portions 120 of the bellows 118 are alongside one another and radially inward or outward of each other (see FIG. 23). This 0.5 inch collapsed state of the stabilizer 110 is approximately the same thickness as the baseboard that is commonly at the bottom of walls and therefore the dresser 60 can be pushed against the baseboard of the wall 62 and the stabilizer 110 would occupy the space between the rear surface 70 of the dresser 60 and the wall 62 at a location above the baseboard.

Bellows 118 also enables the stabilizer 110 to have a limited expanded state shown in FIG. 23. In this expanded state, the stabilizer 110 could have a thickness of about 5 inches, depending the size and construction of the bellows 118 and will limit the forward tipping of the dresser 60 when the outer surface 114A of the plate 114 is attached to the rear surface 70 of the dresser 60 and the outer surface 116A of the plate 116 is attached to the wall 62.

Stabilizer 110 may have a unibody or one-piece construction integrating or incorporating the first and second plates 114, 116 and the bellows 118.

Stabilizer 110 preferably includes attachment structure on the outer surfaces 114A, 116A of the plates 114, 116. As an example, double-sided adhesive material is a suitable attachment structure and is applied to the outer surfaces 114A, 116A of the plates 114, 116, and covered by a pull-off layer. The installer removes the pull-off layer from the adhesive material on the plate 114 and presses the stabilizer 110 against the wall 62 at a location that will be behind the dresser 60 when the dresser 60 is in the desired location. The installer then removes the pull-off layer from the adhesive material on the plate 116 and presses the dresser 60 toward the wall 62 and against the stabilizer 110, ensuring that the adhesive material on the plate 116 adheres to the rear surface 70 of the dresser 60. The dresser 60 is thus firmly attached to the wall 62 and tipping is prevented. Any possible tipping is limited the maximum expansion of the bellows 118. Note that the stabilizer 110 could be installed in the opposite manner with the plate 116 being attached to the wall 62 and the plate 114 being attached to the rear surface of the dresser 60. The direction in which the bellows 118 has its narrow and wide ends is not material to the installation and use of the stabilizer 110.

As an alternative to double-sided adhesive material, the stabilizer 110 can include attachment structure on the outer surfaces 114A, 116A of the plates 114,116 and attachment structure to be placed on the rear surface 70 of the dresser 60 and the wall 62, e.g., cooperating hook and loop fasteners with each piece of hook and loop fasteners having an adhesive side covered by a pull-off layer and the hook fasteners on or adhered to the plates 114, 116. The installer removes the pull-off layer from the loop fasteners of the attachment structure on the plate 114 and presses the stabilizer 110 against the wall 62, the stabilizer 110 being secured to the wall 62 by the adhesive on the loop fasteners and the cooperating hook and loop fasteners on the plate 114. The installer then removes the pull-off layer from the loop fasteners of the attachment structure on the plate 116, while these loop fasteners are engaged with the hook fasteners on the plate 116, and presses the dresser 60 toward the wall 62. The loop fasteners are secured to the rear surface 70 of the dresser 60 by adhesive. The dresser 60 is thus firmly attached to the wall 62 via the adhesive and the cooperating hook and loop fasteners and tipping is prevented. Any possible tipping is limited the maximum expansion of the bellows 118 (see FIGS. 27 and 28).

Figure 26:
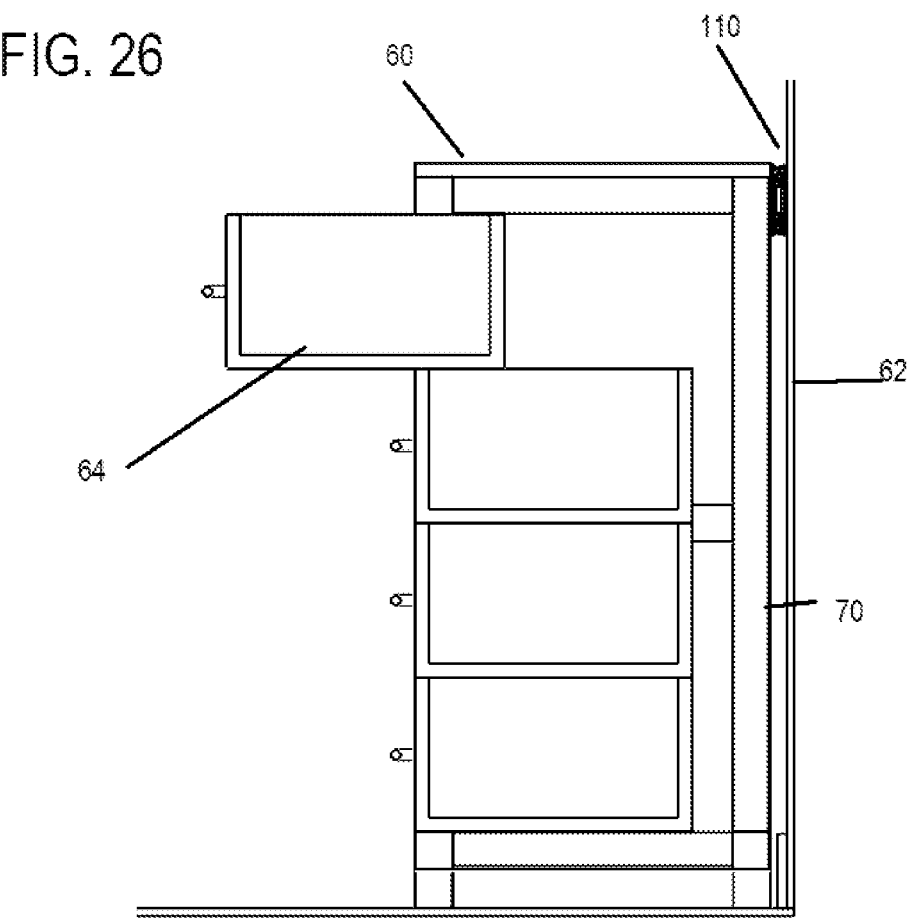
FIG. 26 is a view showing the installation of the stabilizer of FIG. 23 with a dresser against a wall as an example of a piece of furniture.
Figure 27:
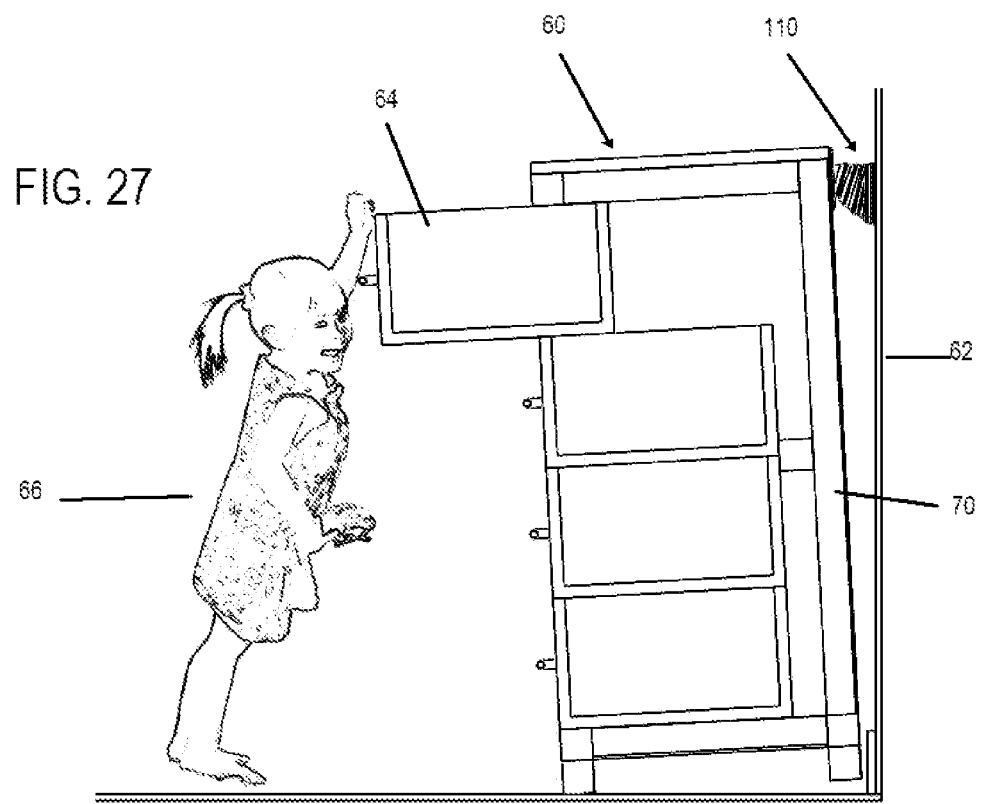
FIG. 27 shows the tip resistance provided to the dresser shown in FIG. 26.

The stabilizer 110 would typically be situated at or close to the top of the dresser 60 for optimum usage and tipping prevention (see FIG. 26). If a single stabilizer 110 is used, the stabilizer 110 should be placed in a central region of the dresser near its top. If two stabilizers 110 are used, they could be placed proximate each lateral edge of the dresser 60. More than two stabilizers 110 may be used and positioning appropriately, as would be readily ascertainable by those skilled in the art to which this invention pertains.

Another alternative attachment structure to attach the first and second plates 114, 116 to the rear surface of the dresser 60 or wall 62 may be the combination of apertures in the plates 114, 116 and screws dimensioned to pass through or thread through the apertures, or nails. Although using screws or nails may be more difficult than double-sided adhesive or hook and loop fasteners, it is possible. Other similar attachment structure may be used, for this embodiment as well as the other embodiments disclosed herein, and all of the above-mentioned attachment structure may be used for the other stabilizers disclosed herein.

When the attachment structure is adhesive material or hook and loop fasteners, the installer should be able to easily reach into the top area behind the dresser 60, to slide the stabilizer 110 to its proper location and then press it tightly to the wall 62 and then to the dresser 60, or vice versa. To ensure proper installation, the installer should tip the dresser 60 forward and further press the first and second plates 114, 116 against the rear surface 70 of the dresser 70 and the wall 62, respectively, tightly to insure the adhesive material or hook and loop fasteners fully engage both surfaces. Finally, the installer should attempt to tip the dresser 60 forward to insure the resistance is present and tipping of the dresser 60 is therefore prevented.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for stabilizing a piece of furniture, comprising:
providing a stabilizer having a rigid elongate portion, a top plate having an inner major surface and an outer planar surface on a side of the top plate opposite the inner major surface of the top plate, and being flexibly connected to an upper end of the elongate portion by a first hinge situated along the inner major surface of the top plate, and a bottom plate having an inner major surface and an outer planar surface on a side of the bottom plate opposite the inner major surface of the bottom plate, and being flexibly connected to a lower end of the elongate portion by a second hinge situated along the inner major surface of the bottom plate, the first hinge pivotally connecting the upper end of the elongate portion to the inner major surface of the top plate and the second hinge pivotally connecting the lower end of the elongate portion to the inner major surface of the bottom plate;
attaching the top plate to a rear surface of the piece of furniture using first attachment structure at least partly on the outer planar surface of the top plate; and
attaching the bottom plate to a vertical support surface behind the piece of furniture using second attachment structure at least partly on the outer planar surface of the bottom plate, the bottom plate being attached to the vertical support surface at a location below a location at which the top plate is attached to the piece of furniture when the piece of furniture is alongside the vertical support surface.

2. The method of claim 1, wherein a central region of the top plate is flexibly connected to the upper end of the elongate portion by the first hinge and a central region of the bottom plate is flexibly connected to the lower end of the elongate portion by the second hinge.

3. The method of claim 1, wherein the top plate is attached to an upper region of the rear surface of the piece of furniture.

4. The method of claim 1, further comprising orienting the elongate portion in a vertical orientation prior to attaching the top plate to the piece of furniture and the bottom plate to the vertical support surface.

5. The method of claim 1, further comprising orienting the elongate portion in a vertical orientation prior to attaching the top plate to the piece of furniture and the bottom plate to the vertical support surface.

6. The method of claim 1, further comprising using hook and loop fasteners as the first attachment structure.

7. The method of claim 1, further comprising using hook and loop fasteners as the second attachment structure.

8. The method of claim 1, wherein the first hinge connects the upper end of the elongate portion to a central region of the inner major surface of the top plate midway between upper and lower edges of the major surface of the top plate.

9. The method of claim 8, wherein the second hinge connects the lower end of the elongate portion to a central region of the inner major surface of the bottom plate midway between upper and lower edges of the major surface of the bottom plate.

10. The method of claim 1, further comprising configuring the stabilizer to have a flat configuration for storage and transport in which respective parts of the elongate portion are alongside the top plate and bottom plate.

11. The method of claim 1, wherein the step of attaching the top plate to the rear surface of the piece of furniture using first attachment structure comprises attaching the top plate at an upper end of the rear surface of the piece of furniture.

12. The method of claim 1, wherein the step of attaching the top plate to the rear surface of the piece of furniture using first attachment structure comprises attaching the top plate along a lateral edge of the rear surface of the piece of furniture.

13. The method of claim 12, further comprising orienting the elongate portion in a vertical orientation prior to attaching the top plate to the piece of furniture and the bottom plate to the vertical support surface.

14. The method of claim 1, further comprising:
providing an additional stabilizer having an elongate portion, a top plate flexibly connected to an upper end of the elongate portion, and a bottom plate flexibly connected to a lower end of the elongate portion;
attaching the top plate of the additional stabilizer to the rear surface of the piece of furniture using third attachment structure on a planar surface of the top plate of the additional stabilizer;
attaching the bottom plate of the additional stabilizer to the vertical support surface behind the piece of furniture using fourth attachment structure on a planar surface of the bottom plate of the additional stabilizer; and
positioning the stabilizer and the additional stabilizer on opposite lateral sides of the rear surface of the piece of furniture.

15. The method of claim 1, further comprising providing the first and second hinges as integral hinges.

16. The method of claim 1, further comprising providing the first and second hinges as living hinges that enable the elongate portion to lie against the top and bottom plates.

17. The method of claim 1, further comprising:
providing an additional stabilizer having an elongate portion, a top plate having an inner major surface and being flexibly connected to an upper end of the elongate portion by a first hinge situated along the inner major surface of the top plate, and a bottom plate having an inner major surface and being flexibly connected to a lower end of the elongate portion by a second hinge situated along the inner major surface of the bottom plate;

attaching the top plate of the additional stabilizer to the rear surface of the piece of furniture using third attachment structure on a planar surface of the top plate of the additional stabilizer; and attaching the bottom plate of the additional stabilizer to the vertical support surface behind the piece of furniture using fourth attachment structure on a planar surface of the bottom plate, the bottom plate being attached to the vertical support surface at a location below a location at which the top plate of the additional stabilizer is attached to the piece of furniture when the piece of furniture is alongside the vertical support surface.

18. A method for stabilizing a piece of furniture, comprising:

providing a stabilizer having a rigid elongate portion, a top plate having an inner major surface and being flexibly connected to an upper end of the elongate portion by a first hinge situated along the inner major surface of the top plate, and a bottom plate having an inner major surface and being flexibly connected to a lower end of the elongate portion by a second hinge situated along the inner major surface of the bottom plate;

attaching the top plate to a rear surface of the piece of furniture using first attachment structure on a planar surface of the top plate;

attaching the bottom plate to a vertical support surface behind the piece of furniture using second attachment structure on a planar surface of the bottom plate, the bottom plate being attached to the vertical support surface at a location below a location at which the top plate is attached to the piece of furniture when the piece of furniture is alongside the vertical support surface; and providing the first and second hinges as integral hinges.

19. A method for stabilizing a piece of furniture, comprising:

providing a stabilizer having a rigid elongate portion, a top plate having an inner major surface and being flexibly connected to an upper end of the elongate portion by a first hinge situated along the inner major surface of the top plate, and a bottom plate having an inner major surface and being flexibly connected to a lower end of the elongate portion by a second hinge situated along the inner major surface of the bottom plate;

attaching the top plate to a rear surface of the piece of furniture using first attachment structure on a planar surface of the top plate;

attaching the bottom plate to a vertical support surface behind the piece of furniture using second attachment structure on a planar surface of the bottom plate, the bottom plate being attached to the vertical support surface at a location below a location at which the top plate is attached to the piece of furniture when the piece of furniture is alongside the vertical support surface; and providing the first and second hinges as living hinges that enable the elongate portion to lie against the top and bottom plates.

20. A method for stabilizing a piece of furniture, comprising:

providing a stabilizer having a rigid elongate portion, a top plate having an inner major surface and being flexibly connected to an upper end of the elongate portion by a first hinge situated along the inner major surface of the top plate, and a bottom plate having an inner major surface and being flexibly connected to a lower end of the elongate portion by a second hinge situated along the inner major surface of the bottom plate;

attaching the top plate to a rear surface of the piece of furniture using first attachment structure on a planar surface of the top plate;

attaching the bottom plate to a vertical support surface behind the piece of furniture using second attachment structure on a planar surface of the bottom plate, the bottom plate being attached to the vertical support surface at a location below a location at which the top plate is attached to the piece of furniture when the piece of furniture is alongside the vertical support surface;

providing an additional stabilizer having an elongate portion, a top plate having an inner major surface and being flexibly connected to an upper end of the elongate portion by a first hinge situated along the inner major surface of the top plate, and a bottom plate having an inner major surface and being flexibly connected to a lower end of the elongate portion by a second hinge situated along the inner major surface of the bottom plate;

attaching the top plate of the additional stabilizer to the rear surface of the piece of furniture using third attachment structure on a planar surface of the top plate of the additional stabilizer; and attaching the bottom plate of the additional stabilizer to the vertical support surface behind the piece of furniture using fourth attachment structure on a planar surface of the bottom plate, the bottom plate being attached to the vertical support surface at a location below a location at which the top plate of the additional stabilizer is attached to the piece of furniture when the piece of furniture is alongside the vertical support surface.

* * * * *